United States Patent
Hedayat et al.

(10) Patent No.: US 10,154,520 B1
(45) Date of Patent: Dec. 11, 2018

(54) METHODS FOR RANDOM ACCESS IN A WIRELESS NETWORK

(71) Applicant: NEWRACOM, INC., Irvine, CA (US)

(72) Inventors: Ahmad Reza Hedayat, Aliso Viejo, CA (US); Sungho Moon, San Jose, CA (US)

(73) Assignee: NEWRACOM, INC., Lake Forest, CA (US)

( * ) Notice: Subject to any disclaimer, the term of this patent is extended or adjusted under 35 U.S.C. 154(b) by 37 days.

(21) Appl. No.: 15/265,794

(22) Filed: Sep. 14, 2016

Related U.S. Application Data

(60) Provisional application No. 62/218,485, filed on Sep. 14, 2015, provisional application No. 62/218,500, filed on Sep. 14, 2015, provisional application No. 62/307,021, filed on Mar. 11, 2016, provisional application No. 62/264,154, filed on Dec. 7, 2015, provisional application No. 62/362,950, filed on Jul. 15, 2016.

(51) Int. Cl.
*H04W 74/08* (2009.01)
*H04W 72/04* (2009.01)

(52) U.S. Cl.
CPC ....... *H04W 74/0833* (2013.01); *H04W 72/04* (2013.01)

(58) Field of Classification Search
None
See application file for complete search history.

(56) References Cited

U.S. PATENT DOCUMENTS

| | | | | |
|---|---|---|---|---|
| 7,826,438 B1* | 11/2010 | Salhotra | ................ | H04L 1/1887 370/345 |
| 9,699,054 B2* | 7/2017 | Wentink | .................. | H04L 43/04 |
| 2007/0097867 A1* | 5/2007 | Kneckt | ............ | H04W 72/1278 370/236 |
| 2010/0135264 A1* | 6/2010 | Nilsson | ................. | H04W 74/08 370/338 |
| 2012/0008490 A1* | 1/2012 | Zhu | .................... | H04W 74/0841 370/216 |

(Continued)

OTHER PUBLICATIONS

"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.

(Continued)

*Primary Examiner* — Christopher T Wyllie

(57) ABSTRACT

A station performs a random access (RA) communication by i) receiving a trigger frame, ii) determining, using information in one or more per-station information parts of the trigger frame, that one or more resource units (RUs) of a response transmission are allocated to RA, iii) selecting a selected RU from the one or more RUs allocated to RA, and iv) in response to receiving the trigger frame, performing the RA communication using the selected RU of the response transmission. In some cases, the station may transmit a data unit associated with an Access Category (AC) as part of the RA communication, receive an acknowledgement frame corresponding to the data unit, and in response to receiving the acknowledgement frame, resume a backoff counter countdown associated with the AC.

16 Claims, 14 Drawing Sheets

(56) References Cited

U.S. PATENT DOCUMENTS

| | | | |
|---|---|---|---|
| 2014/0219088 A1* | 8/2014 | Oyman | H04N 21/23439 370/231 |
| 2015/0244601 A1* | 8/2015 | Wentink | H04L 43/04 370/253 |
| 2016/0056930 A1* | 2/2016 | Seok | H04L 5/0026 370/330 |
| 2016/0165588 A1* | 6/2016 | Ghosh | H04L 5/0007 370/392 |
| 2016/0165589 A1* | 6/2016 | Chu | H04L 5/0007 370/329 |
| 2016/0227579 A1* | 8/2016 | Stacey | H04W 74/0833 |
| 2016/0359653 A1* | 12/2016 | Lee | H04L 27/2613 |
| 2017/0070914 A1* | 3/2017 | Chun | H04W 4/70 |
| 2017/0202026 A1* | 7/2017 | Ahn | H04W 72/0413 |
| 2017/0272138 A1* | 9/2017 | Chun | H04L 29/08 |

OTHER PUBLICATIONS

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

\* cited by examiner

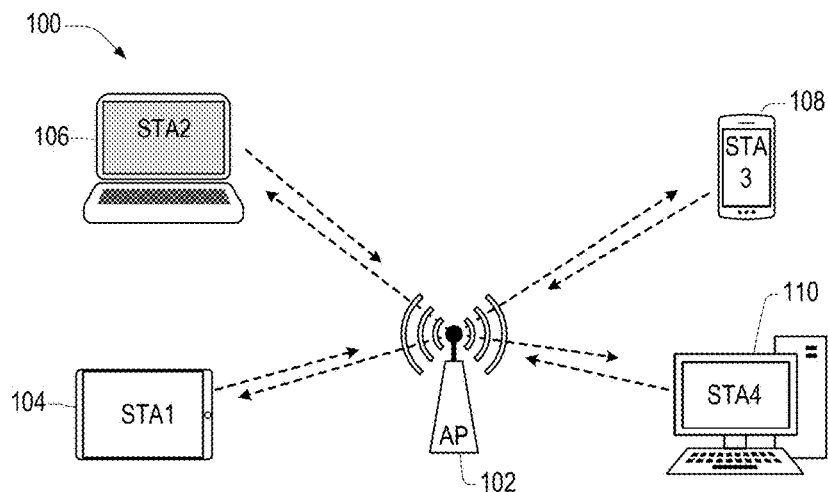
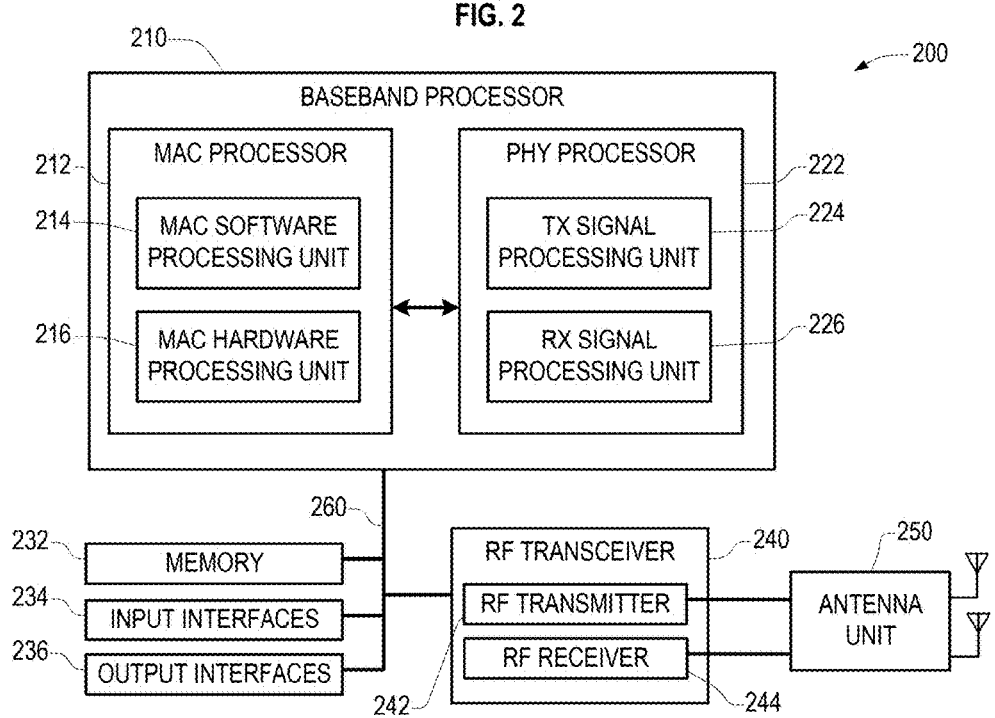

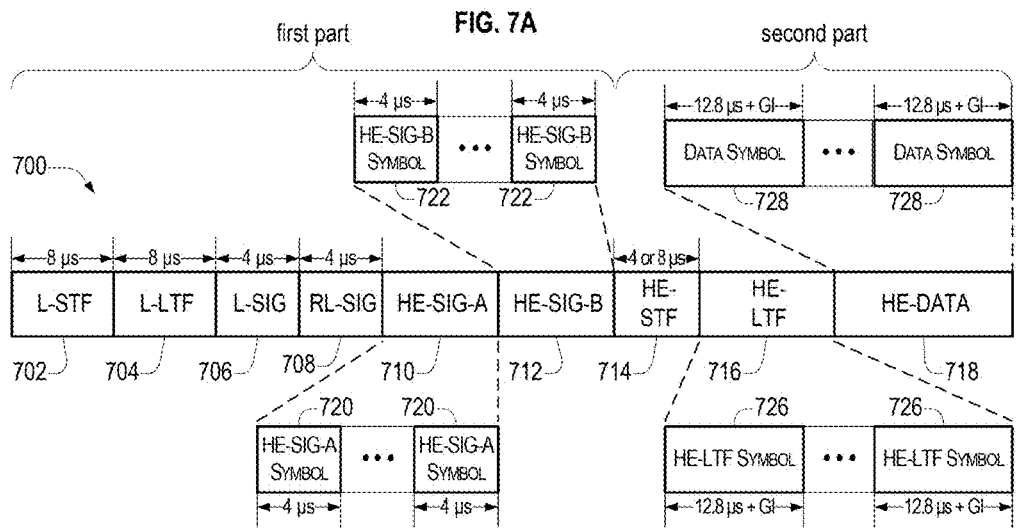

Table 1:

| Element | definition | duration | DFT period | GI | Subcarrier spacing |
|---|---|---|---|---|---|
| Legacy (L)-STF | Non-HT Short Training field | 8 μs | - | - | equiv. to 1,250 kHz |
| L-LTF | Non-HT Long Training field | 8 μs | 3.2 μs | 1.6 μs | 312.5 kHz |
| L-SIG | Non-HT Signal field | 4 μs | 3.2 μs | 0.8 μs | 312.5 kHz |
| RL-SIG | Repeated Non-HT SIGNAL field | 4 μs | 3.2 μs | 0.8 μs | 312.5 kHz |
| HE-SIG-A | HE SIGNAL A field | $N_{HESIGA} * 4$ μs | 3.2 μs | 0.8 μs | 312.5 kHz |
| HE-SIG-B | HE SIGNAL B field | $N_{HESIGB} * 4$ μs | 3.2 μs | 0.8 μs | 312.5 kHz |
| HE-STF | HE Short Training field | 4 or 8 μs | - | - | • non-trigger-based PPDU: (equiv. to) 1,250 kHz; • trigger-based PPDU: (equiv. to) 625 kHz |
| HE-LTF | HE Long Training field | $N_{HELTF} *$ (DFT period + GI)μs | 2xLTF: 6.4 μs 4xLTF: 12.8 μs | supports 0.8, 1.6, 3.2 μs | • 2xLTF: (equiv. to) 156.25 kHz; • 4xLTF: 78.125 kHz |
| HE-DATA | HE DATA field | $N_{DATA} *$ (DFT period + GI)μs | 12.8 μs | supports 0.8, 1.6, 3.2 μs | 78.125 kHz |

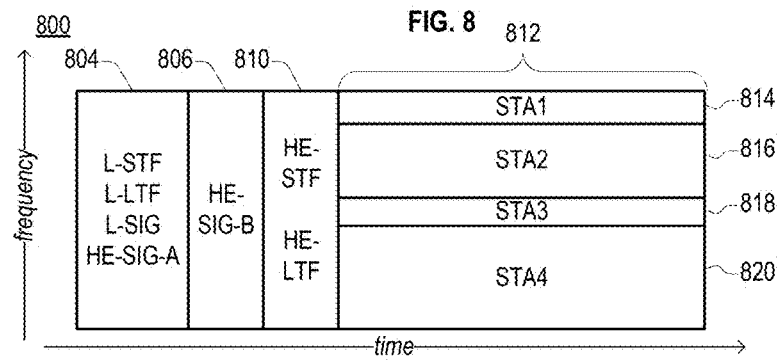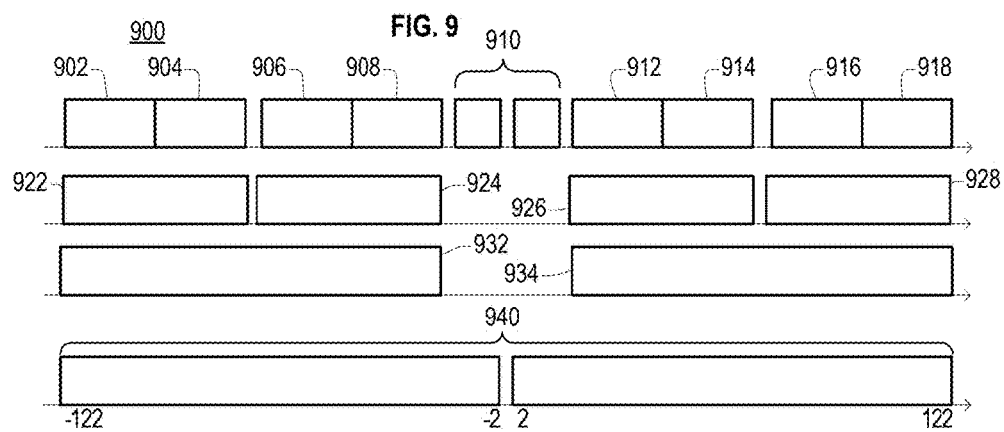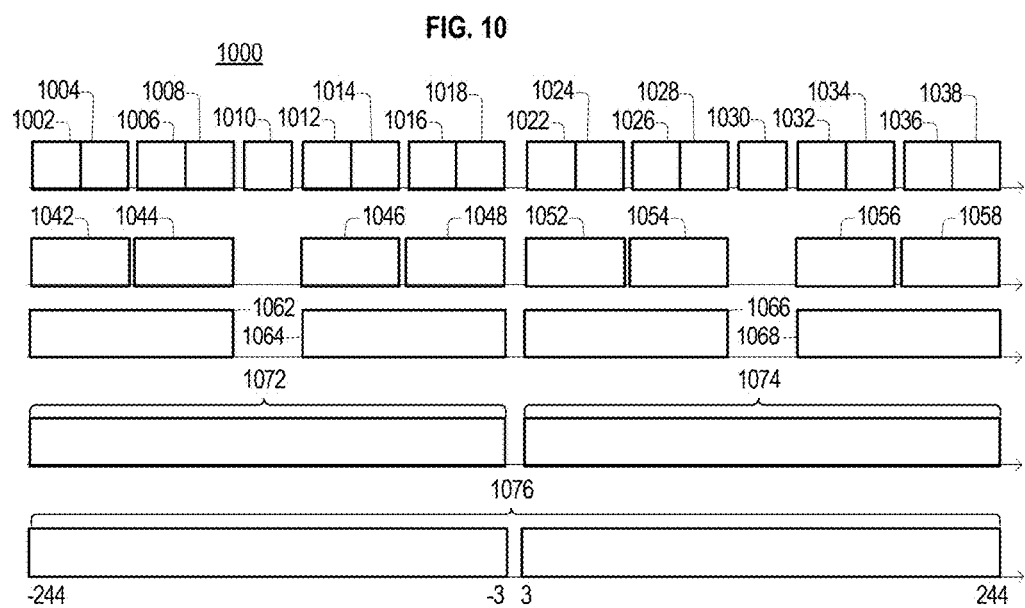

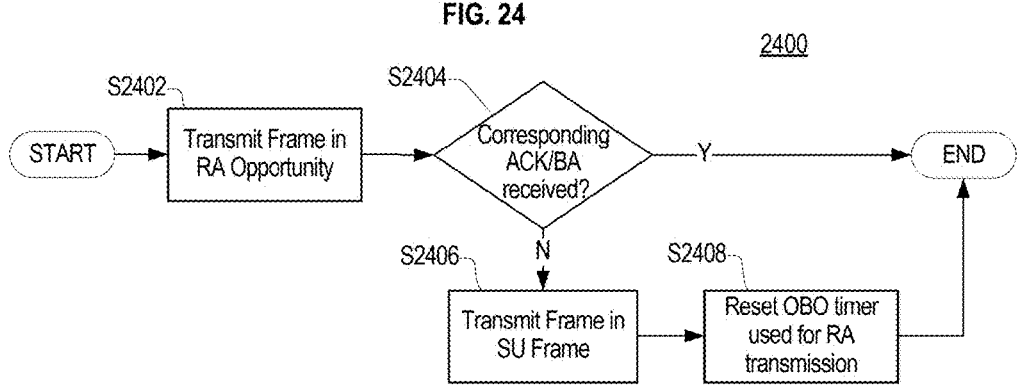
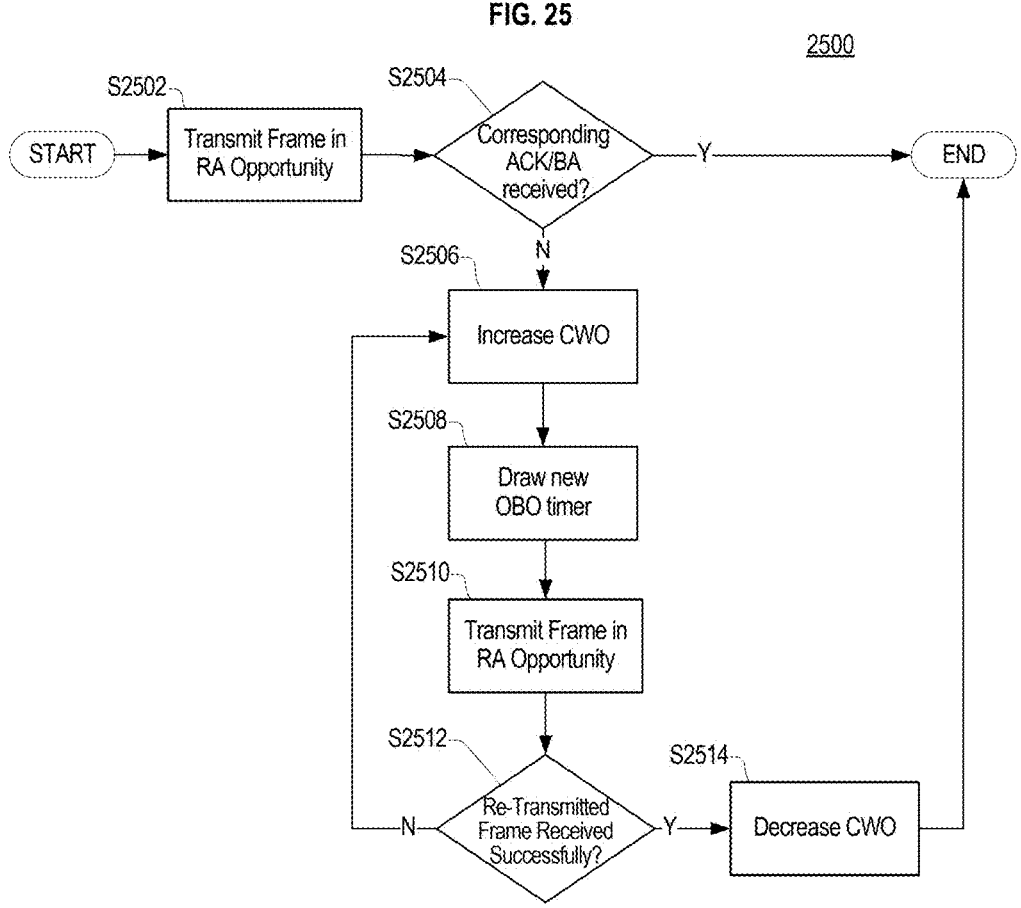

METHODS FOR RANDOM ACCESS IN A WIRELESS NETWORK

CROSS-REFERENCE TO RELATED APPLICATION

This application claims the benefit of U.S. Provisional Patent Application No. 62/218,485, filed Sep. 14, 2015, U.S. Provisional Patent Application No. 62/218,500, filed Sep. 14, 2015, U.S. Provisional Patent Application No. 62/264,154, filed Dec. 7, 2015, U.S. Provisional Patent Application No. 62/307,021, filed Mar. 11, 2016, and U.S. Provisional Patent Application No. 62/362,950, filed Jul. 15, 2016, which are incorporated by reference herein in their entireties.

BACKGROUND

1. Technical Field

The technology described herein relates generally to wireless networking. More particularly, the technology relates Random Access (RA) Up-Link (UL) communications in a wireless network.

2. Description of the Related Art

Wireless LAN (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (IEEE 802.11n). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (IEEE 802.11ac).

Recently, an amendment focused on providing a High Efficiency (HE) WLAN in high-density scenarios is being developed by the IEEE 802.11ax task group. The 802.11ax amendment focuses on improving metrics that reflect user experience, such as average per station throughput, the 5th percentile of per station throughput of a group of stations, and area throughput. Improvements may be made to support environments such as wireless corporate offices, outdoor hotspots, dense residential apartments, and stadiums.

An HE WLAN supports Down-Link (DL) and Up-Link (UL) Multi-User (MU) transmissions such as MU Orthogonal Frequency Division Multiple Access (MU OFDMA) transmission, Multi-User Multi-Input-Multi-Output (MU MIMO) transmissions, and MU transmissions that use both OFDMA and MU-MIMO. Collectively, transmissions using OFDMA, MU-MIMO, or both are referred to herein as MU transmissions.

MU communication as define herein are distinguished from other transmissions, such as broadcast transmissions, by the allocation in the MU communication of only a portion of the channel (such as a sub-channel in an OFDMA communication, a spatial stream in an MU-MIMO communication, or a sub-channel of a spatial stream in a communication using both OFDMA and MU-MIMO) to a particular communication.

Each of MU frames transmitted by the stations using OFDMA may include a first portion transmitted across an entire bandwidth of a wireless channel and one or more second portions transmitted to or by respective stations using respective portions of the bandwidth of the wireless channel. The respective second portions of the MU OFDMA frames are each transmitted using respective bandwidths (that is, respective subchannels) allocated exclusively to each second portion. The information on which bandwidths or subchannels are allocated to which stations in the second portion of the frame may be communicated to the stations using an HE Signal-B (HE-SIG-B) field included in a first portion of the MU OFDMA frame or in a preceding frame, such as a trigger frame.

In an UL MU transmission, an Access Point (AP) may transmit a frame requiring an immediate response to a plurality of stations, such as a trigger frame or another type of frame. In response, the plurality of stations simultaneously transmit respective UL MU transmission frames, referred to herein as trigger-based frames, to the AP.

UL MU communications, and in particular UL OFDMA MU communications, may include portions of the channel, such as one or more Resource Units (RUs) associated with respective subchannels of the channel, that are allocated to Random Access (RA). One or more stations associated with an AP may attempt to perform a UL communication to the AP using an RU allocated to RA, even though that RU is not allocated to the station.

When a large number of stations are participating in an MU OFDMA operation, the communication of the bandwidth allocation information in the HE-SIG-B field, including the communication of which RUs are allocated to RA, may increase the amount of overhead in the frame, which would decrease the performance of the WLAN.

Furthermore, when a large number of stations contend for RUs allocated to RA, backoff procedures, network congestion may occur depending upon the backoff procedures used for controlling the use of the RUs allocated to RA.

SUMMARY

In an embodiment, a method implemented by a station of performing a random access (RA) communication comprises i) receiving, by the station, a first trigger frame, ii) determining, by the station using information in one or more per-station information parts of the first trigger frame, that one or more resource units (RUs) of a response transmission are allocated to RA, iii) selecting, by the station, a selected RU from the one or more RUs allocated to RA, and iv) in response to receiving the first trigger frame, performing, by the station, the RA communication using the selected RU of the response transmission.

In an embodiment, the one or more per-station information parts are one or more per-station info subfields of a High Efficiency Signal B (HE-SIG-B) field.

In an embodiment, determining that the one or more RUs of the response transmission are allocated to RA comprises determining that a first RU of the response transmission is allocated to RA when a first per-station information part associates an identifier of the first RU with a predetermined Association Identifier (AID).

In an embodiment, determining that the one or more RUs of the response transmission are allocated to RA comprises determining that an RU of the response transmission is allocated to RA when none of the one or more per-station information parts indicate that the RU is allocated to a station.

In an embodiment, determining that the one or more RUs of the response transmission are allocated to RA comprises determining that an RU of the response transmission is allocated to RA when none of the one or more per-station information parts indicate that the RU is allocated to a station.

In an embodiment, determining that the one or more RUs of the response transmission are allocated to RA comprises i) determining that a first per-station information part associates an identifier of a first RU of the response transmission with a predetermined reserved Association Identifier (AID), ii) determining that the first RU is allocated to RA when a bandwidth of the first RU is equal to a bandwidth indicated by an RA Bandwidth (RABW) value, and iii) determining that a second RU of the response transmission is allocated to RA when the bandwidth of the first RU is greater than the bandwidth indicated by the RABW value, a bandwidth of the second RU is equal to the bandwidth indicated by the RABW value, and the second RU is comprised of tones that are within the first RU.

In an embodiment, the method further comprises determining the RABW value from an indication in a common information part of the first trigger frame.

In an embodiment, the common information part is a common information subfield of a High Efficiency Signal B (HE-SIG-B) field of the first trigger frame.

In an embodiment, the method further comprises receiving a Beacon frame, and determining the RABW value from an indication in the beacon frame.

In an embodiment, the RABW value is a predetermined value.

In an embodiment, determining that the one or more RUs of the response transmission are allocated to RA comprises i) determining that a second per-station information part associates an identifier of a third RU of the response transmission with a predetermined AID, ii) determining that the third RU is allocated to RA when a bandwidth of the third RU is equal to the bandwidth indicated by the RABW value, and iii) determining that a fourth RU of the response transmission is allocated to RA when the bandwidth of the third RU is greater than the bandwidth indicated by the RABW value, a bandwidth of the fourth RU is equal to the bandwidth indicated by the RABW value, and the fourth RU is comprised of tones that are comprised within the third RU.

In an embodiment, determining that the one or more RUs of the response transmission are allocated to RA comprises determining that a fifth RU of the response transmission is allocated to RA when the bandwidth of the third RU is greater than the bandwidth indicated by the RABW value, a bandwidth of the fifth RU is equal to the bandwidth indicated by the RABW value, and the fifth RU is comprised of tones that are comprised within the third RU and are different than the tones comprising the fourth RU.

In an embodiment, determining that the one or more RUs of the response transmission are allocated to RA comprises i) determining that a per-station information part associates an identifier of a first RU of the response transmission with a first reserved AID. The first reserved AID is one of a plurality of reserved AIDs, the plurality of reserved AIDs respectively corresponding to sets of stations. Determining that the one or more RUs of the response transmission are allocated to RA further comprises determining whether the station is a member of the set of stations corresponding to the first reserved AID, determining that the first RU is allocated to RA when the station is determined to be a member of the set of stations corresponding to the first reserved AID, and determining that the first RU is not allocated to RA when the station is determined to not be a member of the set of stations corresponding to the first reserved AID.

In an embodiment, determining whether the station is a member of a set of station corresponding to the first reserved AID comprises performing a masked comparison of the AID of the station to the first reserved AID.

In an embodiment, the set of stations corresponding to the first reserved AID is one of the set of stations associated with a Basic Service Set (BSS) of the transmitter of the first trigger frame, the set of stations not associated with any BSS, and the set of stations receiving the trigger frame.

In an embodiment, the first trigger frame is received in a received multi-user transmission.

In an embodiment, the received multi-user transmission includes a second trigger frame that allocates one or more RUs of the response transmission to another station.

In an embodiment, the method further comprises performing the RA communication by transmitting a data unit associated with a first Access Class (AC), receiving, by the station, an acknowledgement frame corresponding to the transmitted data unit, and in response to receiving the acknowledgement frame corresponding to the transmitted data unit, resuming a backoff counter countdown associated with the first AC.

In an embodiment, the method further comprises freezing the backoff counter countdown associated with the first AC in response to receiving the first trigger frame.

In an embodiment, the method further comprises decrementing a backoff counter associated with a second AC in response to transmitting the data unit associated with the first AC.

BRIEF DESCRIPTION OF THE DRAWINGS

FIG. 1 illustrates a wireless network according to an embodiment.

FIG. 2 is a schematic diagram of a wireless device according to an embodiment.

FIG. 7A illustrates an HE PPDU according to an embodiment.

FIG. 7B shows properties of fields of the HE PPDU frame of FIG. 7A according to an embodiment.

FIG. 8 illustrates a DL MU OFDMA PPDU being transmitted to a set of stations, according to an embodiment.

FIG. 9 illustrates Resource Unit (RU) definitions in a 20 MHz bandwidth, according to an embodiment.

FIG. 10 illustrates RU definitions in a 40 MHz bandwidth, according to an embodiment.

FIG. 24 illustrates a process for re-transmitting a frame, according to an embodiment.

FIG. 25 illustrates a process for re-transmitting a frame, according to another embodiment.

DETAILED DESCRIPTION

Figure 3A:
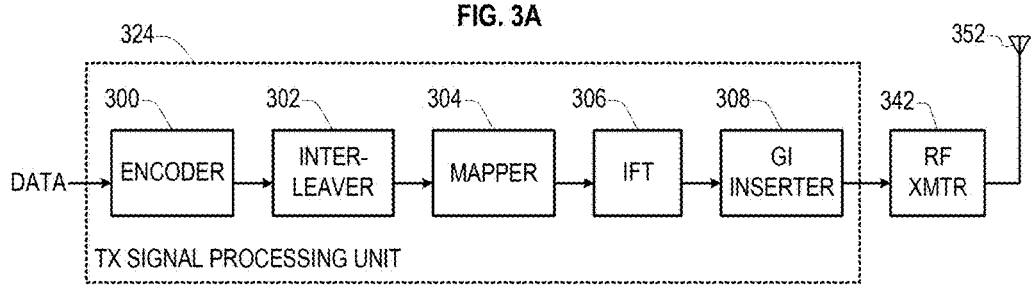
FIG. 3A illustrates components of a wireless device configured to transmit data according to an embodiment.

The technology described herein relates generally to wireless networking. More particularly, the technology relates to simultaneous uplink (UL) communications by stations in a wireless network using one or more of Multi-User (MU) Multi-Input-Multi-Output (MIMO) and MU Orthogonal Frequency Division Multiple Access (OFDMA) technologies.

In the following detailed description, certain illustrative embodiments have been illustrated and described. As those skilled in the art would realize, these embodiments are capable of modification in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless network includes an infrastructure Basic Service Set (BSS) 100 of a Wireless Local Area Network (WLAN). In an 802.11 wireless LAN (WLAN), the BSS provides the basic organizational unit and typically includes an Access Point (AP) and one or more associated stations (STAs). In FIG. 1, the BSS 100 includes an Access Point 102 (also referred to as the AP) wirelessly communicating with first, second, third, and fourth wireless devices (or stations) 104, 106, 108, and 110 (also referred to as stations STA1, STA2, STA3, and STA4, respectively). The wireless devices may each include a medium access control layer (MAC) and a physical layer (PHY) according to an IEEE 802.11 standard.

Although FIG. 1 shows the BSS 100 including only the first to fourth stations STA1 to STA4, embodiments are not limited thereto and may comprise BSSs including any number of stations.

The AP 102 is a station, that is, a STA, configured to control and coordinate functions of the BSS 100. The AP 102 may transmit information to a single station selected from the plurality of stations STA1 to STA4 in the BSS 100 using a single frame, or may simultaneously transmit information to two or more of the stations STA1 to STA4 in the BSS 100 using either a single Orthogonal Frequency Division Multiplexing (OFDM) broadcast frame, a single OFDM Multi-User Multi-Input-Multi-Output (MU-MIMO) transmission, or a single Orthogonal Frequency Division Multiple Access (OFDMA) frame.

The stations STA1 to STA4 may each transmit data to the AP 102 using a single frame, or transmit information to and receive information from each other using a single frame. Two or more of the stations STA1 to STA4 may simultaneously transmit data to the AP 102 using an Uplink (UL) OFDMA frame. When the BSS 100 supports MU-MIMO, two or more of the stations STA1 to STA4 may simultaneously transmit data to the AP 102 using an UL MU-MIMO frame.

In another embodiment, the AP 102 may be absent and the stations STA1 to STA4 may be in an ad-hoc network.

Each of the stations STA1 to STA4 and the AP 102 includes a processor and a transceiver, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium. The transceiver represents a unit functionally connected to the processor, and designed to transmit and receive a frame through the wireless network.

The transceiver may include a single component that performs the functions of transmitting and receiving, or two separate components each performing one of such functions. The processor and transceiver of the stations STA1 to STA4 and the AP 102 may be respectively implemented using hardware components, software components, or both.

The AP 102 may be or may include a WLAN router, a stand-alone Access Point, a WLAN bridge, a Light-Weight Access Point (LWAP) managed by a WLAN controller, and the like. In addition, a device such as a personal computer, tablet computer, or cellular phone may configured able to operate as the AP 102, such as when a cellular phone is configured to operate as a wireless "hot spot."

Each of the stations STA1 to STA4 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but embodiments are not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

A type and subtype of a frame may be identified using a type field and a subtype field included in a control field of the frame, as prescribed in the applicable standard.

FIG. 2 illustrates a schematic block diagram of a wireless device 200 according to an embodiment. The wireless or WLAN device 200 may be included in the AP 102 or any of the stations STA1 to STA4 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the storage device 232, which may include a non-transitory computer readable medium having software (e.g., computer programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit (SPU) 224 and a receiving SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, touch screen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design.

The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

FIG. 3A illustrates components of a wireless device configured to transmit data according to an embodiment, including a Transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data DATA. In an embodiment, the encoder 300 includes a forward error correction (FEC) encoder. The FEC encoder may include a binary convolutional code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number NSS of spatial streams of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number NSTS of space-time streams and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IIFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
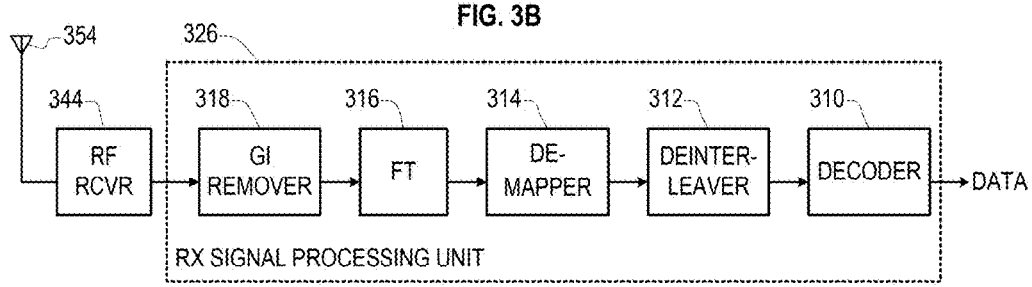
FIG. 3B illustrates components of a wireless device configured to receive data according to an embodiment.

FIG. 3B illustrates components of a wireless device configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 200 will assess the availability of the wireless medium using Clear Channel Assessment (CCA). If the medium is occupied, CCA may determine that it is busy, while if the medium is available, CCA determines that it is idle.

Figure 4:
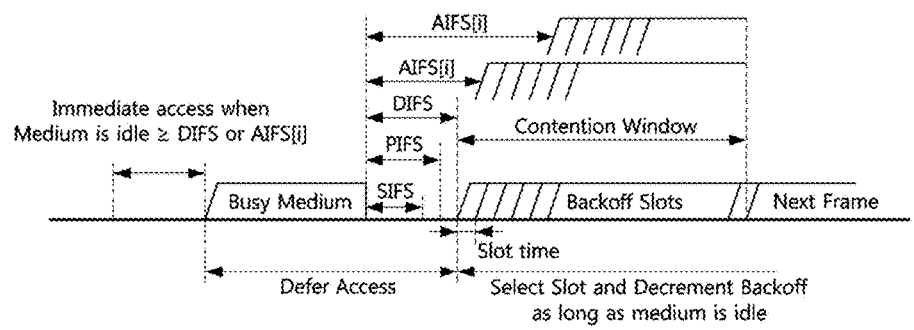
FIG. 4 illustrates Inter-Frame Space (IFS) relationships.

FIG. 4 illustrates Inter-Frame Space (IFS) relationships. FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time.

A data frame is used for transmission of data forwarded to a higher layer. The WLAN device transmits the data frame after performing backoff if a DIFS has elapsed during which DIFS the medium has been idle.

A management frame is used for exchanging management information, which is not forwarded to the higher layer. Subtype frames of the management frame include a beacon frame, an association request/response frame, a probe request/response frame, and an authentication request/response frame.

A control frame is used for controlling access to the medium. Subtype frames of the control frame include a request to send (RTS) frame, a clear to send (CTS) frame, and an acknowledgement (ACK) frame.

When the control frame is not a response frame of another frame, the WLAN device transmits the control frame after performing backoff if a DIFS has elapsed during which DIFS the medium has been idle. When the control frame is the response frame of another frame, the WLAN device transmits the control frame after a SIFS has elapsed without performing backoff or checking whether the medium is idle.

A WLAN device that supports a Quality of Service (QoS) functionality (that is, a QoS station) may transmit the frame after performing backoff if an AIFS for an associated access category (AC), (AIFS[AC]), has elapsed. When transmitted by the QoS station, any of the data frame, the management frame, and the control frame which is not the response frame may use the AIFS[AC] of the AC of the transmitted frame.

A WLAN device may perform a backoff procedure when the WLAN device that is ready to transfer a frame finds the medium busy. In addition, a WLAN device operating according to the IEEE 802.11n and 802.11ac standards may perform the backoff procedure when the WLAN device infers that a transmission of a frame by the WLAN device has failed.

The backoff procedure includes determining a random backoff time composed of N backoff slots, each backoff slot having a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device detects no medium activity for the duration of a particular backoff slot, the backoff procedure shall decrement the backoff time by the slot time. When the WLAN determines that the medium is busy during a backoff slot, the backoff procedure is suspended until the medium is again determined to be idle for the duration of a DIFS or EIFS period. The WLAN device may perform transmission or retransmission of the frame when the backoff timer reaches zero.

The backoff procedure operates so that when multiple WLAN devices are deferring and execute the backoff procedure, each WLAN device may select a backoff time using a random function, and the WLAN device selecting the smallest backoff time may win the contention, reducing the probability of a collision.

Figure 5:
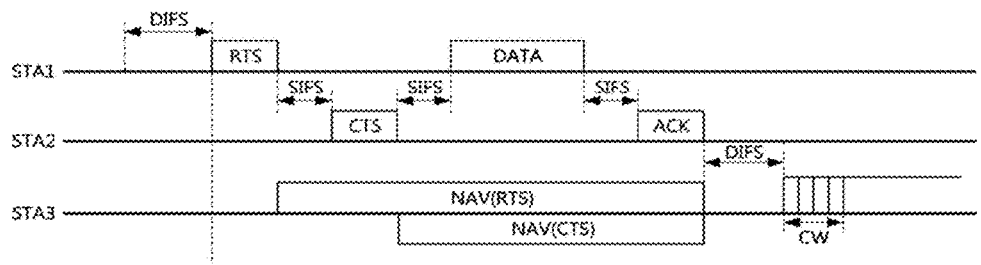
FIG. 5 illustrates a Carrier Sense Multiple Access/Collision Avoidance (CSMA/CA) based frame transmission procedure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1, a frame transmitted from the second station STA2, or both can be received. The stations STA1, STA2, and STA3 may be WLAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the STA1 may transmit a Ready-To-Send (RTS) frame to the second station STA2. Upon receiving the RTS frame, after a SIFS the second station STA2 may transmit a Clear-To-Send (CTS) frame as a response of the RTS frame. If Dual-CTS is enabled and the second station STA2 is an AP, the AP may send two CTS frames in response to the RTS frame: a first CTS frame in the legacy non-HT format, and a second CTS frame in the HT format.

When the third station STA3 receives the RTS frame, it may set a NAV timer of the third station STA3 for a transmission duration of subsequently transmitted frames (for example, a duration of SIFS+CTS frame duration+SIFS+data frame duration+SIFS+ACK frame duration) using duration information included in the RTS frame. When the third station STA3 receives the CTS frame, it may set the NAV timer of the third station STA3 for a transmission duration of subsequently transmitted frames using duration information included in the CTS frame. Upon receiving a new frame before the NAV timer expires, the third station STA3 may update the NAV timer of the third station STA3 by using duration information included in the new frame. The third station STA3 does not attempt to access the channel until the NAV timer expires.

When the STA1 receives the CTS frame from the second station STA2, it may transmit a data frame to the second station STA2 after SIFS elapses from a time when the CTS frame has been completely received. Upon successfully receiving the data frame, the second station STA2 may transmit an ACK frame as a response of the data frame after SIFS elapses.

When the NAV timer expires, the third station STA3 may determine whether the channel is busy using the carrier sensing. Upon determining that the channel is not used by other devices during a DIFS after the NAV timer has expired, the third station STA3 may attempt to access the channel after a contention window according to a backoff process elapses.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame.

Figure 6:
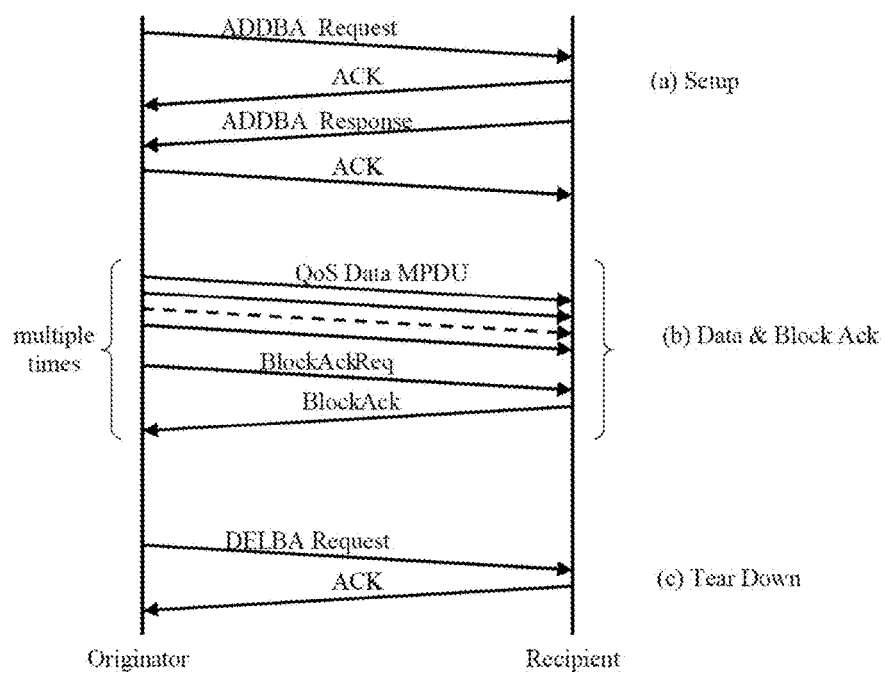
FIG. 6 illustrates an embodiment in which a station acknowledges successful receipt of a frame using a Block Acknowledgment frame.

FIG. 5 shows the second station STA1 transmitting an ACK frame to acknowledge the successful reception of a frame by the recipient. FIG. 6 illustrates an embodiment in which a station acknowledges successful receipt of a frame using a Block Acknowledgment (Block Ack, BlockAck or BA) frame.

The Block Ack mechanism improves channel efficiency by aggregating several acknowledgments into one frame. There are two types of Block Ack mechanisms: Immediate and Delayed. The Immediate Block Ack mechanism is intended for use with high-bandwidth, low-latency traffic. The delayed Block Ack mechanism is intended for applications that tolerate moderate latency.

Here, a station with data to send which will be acknowledged using the Block Ack mechanism is referred to as the originator, and the receiver of that data as the recipient. An AP can be the recipient or the originator.

The Block Ack mechanism is initialized using a setup process that includes an exchange of ADDBA Request and ADDBA Response frames. The ADDBA Request and ADDBA Response frames include indications of whether Aggregate MAC Service Data Units (A-MSDUs) are permitted in the frames using the Black Ack mechanism, whether Immediate or Delayed Block Ack is to be used, and other information.

After initialization, blocks of data frames—in particular, Quality of Service (QoS) data frame according to IEEE Std 802.11-2012—may be transmitted from the originator to the recipient. A block may be started within a polled TXOP or by winning Enhanced Distributed Channel Access (EDCA) contention. The number of frames in the block is limited, and the amount of state that is to be kept by the recipient is bounded.

The MPDUs within the block of frames are acknowledged by a BlockAck frame, which is requested by a BlockAckReq frame.

The Block Ack mechanism does not require the setting up of a Traffic Stream (TS); however, QoS stations using the TS facility may choose to signal their intention to use a Block Ack mechanism for the scheduler's consideration in assigning Transmission Opportunities (TXOPs).

Acknowledgments of frames belonging to the same Traffic Identifier (TID), but transmitted during multiple TXOPs, may also be combined into a single BlockAck frame. This mechanism allows the originator to have flexibility regarding the transmission of data MPDUs. The originator may split the block of frames across TXOPs, separate the data transfer and the Block Ack exchange, and interleave blocks of MPDUs carrying all or part of MAC Service Data Units (MSDUs) or Aggregate MSDUs (A-MSDUs) for different TIDs or receiver addresses.

The Block Ack mechanism is torn down using a DELBA frame including a DELBA Request. The DELBA frame is sent by either the originator or the recipient to terminate participation in the Block Ack mechanism.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving Physical Layer Convergence Protocol (PLCP) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs.

A PHY entity may define PPDUs that are individually addressed using an Association Identifier (AID) or Partial AID and may also define PPDUs that are group addressed based on Group ID (GID).

A PHY entity may provide support for 20 MHz, 40 MHz, 80 MHz and 160 MHz contiguous channel widths and support for a 80+80 MHz non-contiguous channel width. Each channel includes a plurality of subcarriers, which may also be referred to as tones. Data subcarriers within the channels may be modulated using binary phase shift keying (BPSK), quadrature phase shift keying (QPSK), 16-quadrature amplitude modulation (16-QAM), 64-QAM and 256-QAM. Forward error correction (FEC) coding (such as convolutional or Low Density Parity Check (LDPC) coding) may be used with coding rates of 1/2, 2/3, 3/4 and 5/6.

A PHY entity may define fields denoted as Legacy Signal (L-SIG), Signal A (SIG-A), and Signal B (SIG-B) within which some necessary information about PLCP Service Data Unit (PSDU) attributes are communicated. For example, a High Efficiency (HE) PHY entity may define L-SIG, HE-SIG-A, and HE-SIG-B fields. In an embodiment, the symbols in these fields are encoded with the most robust MCS (and therefore least efficient) of the PHY entity.

To prevent excessive consumption of WLAN resource by overhead, the L-SIG, SGI-A, and SIG-B fields have a limited number of bits and it is advantageous to encode them in the most compact form possible. In a receiving STA, the symbols of these fields are decoded first in order to obtain vital information about the PSDU attributes and some MAC attributes.

In the IEEE Std 802.11ac, SIG-A and SIG-B fields are called VHT SIG-A and VHT SIG-B fields. Hereinafter, IEEE Std 802.11ax SIG-A and SIG-B fields may be respectively referred to as HE-SIG-A and HE-SIG-B fields, or simply as SIG-A and SIG-B fields.

FIG. 7 illustrates an HE PPDU 700 according to an embodiment. A transmitting station generates the HE PPDU frame 700 and transmits it to one or more receiving stations. The receiving stations receive, detect, and process the HE PPDU frame 700.

The HE PPDU frame 700 includes a Legacy Short Training Field (L-STF) field 702, a Legacy (i.e. a Non-High Throughput (Non-HT)) Long Training Field (L-LTF) 704, a Legacy Signal (L-SIG) field 706, and a Repeated L-SIG field (RL-SIG) 708, which together comprise a legacy preamble. The L-STF 704 of a non-trigger-based PPDU has a periodicity of 0.8 µs with 10 periods.

The HE PPDU frame 700 also includes an HE-SIG-A field 710, an optional HE-SIG-B field 712, an HE-STF 714, an HE-LTF 716, and an HE-Data field 718.

The legacy preamble, the HE-SIG-A field 710, and the HE-SIG-B field 712 when present, comprise a first part of the HE PPDU frame 700. In an embodiment, the first part of the HE PPDU frame 700 is decoded using a 64-element Discrete Fourier Transform (DFT), having a basic subcarrier spacing of 312.5 KHz.

The HE-SIG-A field 710 is duplicated on each 20 MHz segment after the legacy preamble to indicate common control information. The HE-SIG-A field 710 includes a plurality of OFDM HE-SIG-A symbols 720 each having a duration including a Guard Interval (GI) of 4 µs. A number of the HE-SIG-A symbols 720 in the HE-SIG-A field 710 is indicated by $N_{HESIGA}$ and is either 2 or 4.

The HE-SIG-B field 712 is included in Down-Link (DL) Multi-User (MU) PPDUs. The HE-SIG-B field 712 includes a plurality of OFDM HE-SIG-B symbols 722 each having a duration including a Guard Interval (GI) of 4 µs. In embodiments, Single User (SU) PPDUs, Up-Link (UL) MU PPDUs, or both do not include the HE-SIG-B field 712. A number of the HE-SIG-B symbols 722 in the HE-SIG-B field 712 is indicated by $N_{HESIGB}$ and is variable.

An HE-STF 714 of a non-trigger-based PPDU has a periodicity of 0.8 µs with 5 periods. A non-trigger-based PPDU is a PPDU that is not sent in response to a trigger frame. An HE-STF 714 of a trigger-based PPDU has a periodicity of 1.6 µs with 5 periods. A trigger-based PPDU is an UL PPDU sent in response to a trigger frame.

The HE-LTF 716 includes one or more OFDM HE-LTF symbols 726 each having a duration of 12.8 µs plus a Guard Interval (GI). The HE PPDU frame 700 may support a 2×LTF mode and a 4×LTF mode. In the 2×LTF mode, an HE-LTF symbol 726 excluding a Guard Interval (GI) is equivalent to modulating every other tone in an OFDM symbol of 12.8 µs excluding the GI, and then removing the second half of the OFDM symbol in a time domain. A number of the HE-LTF symbols 726 in the HE-LTF field 716 is indicated by $N_{HELTF}$, and is equal to 1, 2, 4, 6, or 8.

The HE-Data field 718 includes one or more OFDM HE-Data symbols 728 each having a duration of 12.8 us plus a Guard Interval (GI). A number of the HE-Data symbols 728 in the HE-Data field 718 is indicated by $N_{DATA}$ and is variable.

FIG. 7 shows a Table 1 indicating additional properties of the fields of the HE PPDU frame 700 of FIG. 7, according to an embodiment.

The descriptions below, for sake of completeness and brevity, refer to OFDMA-based 802.11 technology. Unless otherwise indicated, a station refers to a non-AP HE STA, and an AP refers to an HE AP.

FIG. 8 illustrates transmission of a DL MU OFDMA PPDU 800 to a set of stations, according to an embodiment. The set of stations includes first, second, third, and fourth stations STA1, STA2, STA3, and STA4. The concepts described herein with respect to DL OFDMA frame 800 also apply to UL OFDMA frames unless specifically stated otherwise. The bandwidth of the DL OFDMA frame 800 may be 20, 40, 80, 160, or 80+80 MHz.

In FIG. 8, a horizontal dimension is a time dimension or number of OFDM symbols, and a vertical dimension is a frequency dimension, or a number of tones or subcarriers. For a given Fourier Transform (FT) size, the number of tones is a fixed value; however, depending on the subcarrier spacing, two OFDM symbols with, for example, respective FT sizes of 64 and 256 may require the same bandwidth to transmit.

Hereinafter, the term sub-band refers to a set of contiguous subcarriers that as a whole are assigned for a payload whose expected destination is a single station, or a set of stations. A set of sub-bands or a set of subcarriers may also be referred to as a Resource Unit (RU). A sub-band is represented in FIG. 8 as a horizontal partition of the DL OFDMA PPDU 800 where a set of contiguous tones for a contiguous set of OFDM symbols are designated for a given payload whose expected destination is a station or a set of stations. The bandwidth assigned to payloads of the stations STA1 to STA4 depend on the respective payload sizes, on a MCSs and numbers of spatial streams that the AP determines for the respective sub-band transmissions, and on the overall considerations that the AP needs to address in order to align the length or duration of various PSDU sub-bands.

The DL OFDMA PPDU 800 includes a first portion 804 including an L-STF, an L-LTF, and an L-SIG field based on IEEE Std 802.11n and 802.11ac. The symbols in these fields serve to make the DL OFDMA PPDU 800 compatible with legacy designs and products.

The L-STF, L-LTF, and L-SIG symbols of the first portion 804 are modulated using a Fourier Transform (FT) size of 64 on a 20 MHz channel and are duplicated within each 20 MHz channel of the DL OFDMA PPDU 800 when the DL OFDMA PPDU 800 has a bandwidth wider than 20 MHz.

The first portion 804 also includes an HE-SIG-A field. The symbols of the HE-SIG-A field may carry necessary information regarding each PSDU and regarding the RF, PHY, and MAC properties of the DL OFDMA PPDU 800.

The DL OFDMA PPDU 800 includes an HE-SIG-B field 806. The symbols of the HE-SIG-B field 806 may carry necessary information regarding each PSDU and regarding the RF, PHY, and MAC properties of the DL OFDMA PPDU 800. In an embodiment, the HE-SIG-B field 806 may not always be present in all DL OFDM PPDUs and is not present in UL OFDMA PPDUs.

In an embodiment, the HE SIG-A field of the first portion 804 and HE-SIG-B field 806 are modulated using an FT size of 64. In another embodiment, the HE SIG-A field of the first portion 804 and HE-SIG-B field 806 are modulated using an FT size of 256. In another embodiment, the HE SIG-A field of the first portion 804 are modulated using an FT size of 64 and the HE-SIG-B field 806 are modulated using an FT size of 256.

The DL OFDMA PPDU 800 includes HE-STF and HE-LTF symbols in a second portion 810. The HE-STF and HE-LTF symbols are used to perform necessary RF and PHY processing for each PSDU in the DL OFDMA PPDU 800, for the whole DL OFDMA PPDU 800, or both. Depending on whether the HE-STF and HE-LTF symbols in the second portion 810 are beamformed or not, there might be two or more sets of such symbols.

The DL OFDMA PPDU 800 includes a Multi-User (MU) payload region 812. The MU payload region 812 includes first, second, third, and fourth unicast PSDUs 814, 816, 818, and 820 intended for the first, second, third, and fourth stations STA1, STA2, STA3, and STA4, respectively. Each unicast PSDU 814, 816, 818, and 820 contains a respective payload that is destined to the respective stations STA1, STA2, STA3, and STA4 plus necessary MAC padding and PHY padding. The unicast PSDU 814, 816, 818, and 820 are sub-band PSDUs.

A bandwidth of the MU payload region 812 is divided into one or more Resource Units (RUs), and each of the PSDUs 814, 816, 818, and 820 are allocated one or more of the RUs. In an embodiment, an RU is allocated to no more than one PSDU.

The unicast PSDUs 814, 816, 818, and 820 are destined to respective stations that are associated with the AP. The presence and length of unicast PSDUs 814, 816, 818, and 820 in respective one or more sub-bands and the respective stations that are the recipients of the unicast PSDUs 814, 816, 818, and 820 may be indicated by the HE SIG-A field, the HE-SIG-B field, or both.

In an embodiment, the DL OFDMA PPDU 800 may include a full-band transmission region (not shown) for unicast or broadcast/multicast full-band PSDU(s). The full-band transmission region may be an optional region in a DL OFDMA PPDU 800 and may have a variable length. The full-band transmission region includes one or more sequential symbols that each covers the whole bandwidth of the DL OFDMA PPDU 800 and that occur before the start of a MU payload region 812. The full-band transmission region may not be present in an UL OFDMA PPDU.

When the full-band transmission region is present in the DL OFDMA PPDU 800, there may be a set of HE-STF and/or HE-LTF symbols that immediately precede the full-band PSDUs included in the full-band transmission region (not shown), where the set of HE-STF and/or HE-LTF symbols are not beamformed. The one or more full-band PSDUs in the full-band transmission region 808 could be carried with FT size=64 or FT size=256 according to a design choice to have the full-band PSDUs in the full-band transmission region 808 carried with FT size=64 as the HE-SIG-A field is or carried with FT size=256 as the MU payload region 812 is.

One or more of a Broadcast full-band PSDU, a Multicast full-band PSDU, and a unicast full-band PSDUs may be located in the full-band transmission region and destined to all, some, or one, respectively, of the stations that are associated with the AP. The presence and length of the full-band PSDUs may be indicated in the HE SIG-A field, the HE-SIG-B field, or both.

Each PSDU in the DL OFDMA PPDU 800, whether full-band or sub-band, contains a payload that is destined to a station, or to several stations, plus the necessary MAC padding and PHY padding.

FIG. 9 illustrates Resource Unit (RU) definitions in a 20 MHz bandwidth 900 according to an embodiment. Within the 20 MHz bandwidth 900 are defined:

- first to ninth 26-subcarrier RUs 902, 904, 906, 908, 910, 912, 914, 916, and 918, each occupying approximately 2 MHz of the bandwidth,
- first to fourth 52-subcarrier RUs 922, 924, 926 and 928, each occupying approximately 4 MHz of the bandwidth,
- first and second 106-subcarrier RUs 932 and 934, each occupying approximately 8 MHz of the bandwidth, and
- a 242-subcarrier RU 940 occupying 40 MHz of the bandwidth.

FIG. 10 illustrates RU definitions in a 40 MHz bandwidth 1000 according to an embodiment. Within the 40 MHz bandwidth 1000 are defined:

- first to eighteenth 26-subcarrier RUs 1002, 1004, 1006, 1008, 1010, 1012, 1014, 1016, 1018, 1022, 1024, 1026, 1028, 1030, 1032, 1034, 1036, and 1038, each occupying approximately 2 MHz of the bandwidth,
- first to eighth 52-subcarrier RUs 1042, 1044, 1046, 1048, 1052, 1054, 1056, and 1058, each occupying approximately 4 MHz of the bandwidth,
- first to fourth 106-subcarrier RUs 1062, 1064, 1066, and 1068, each occupying approximately 8 MHz of the bandwidth,
- first and second 242-subcarrier RUs 1072 and 1074, each occupying 20 MHz of the bandwidth, and
- a 484-subcarrier RU 1076 occupying 40 MHz of the bandwidth.

Figure 11:
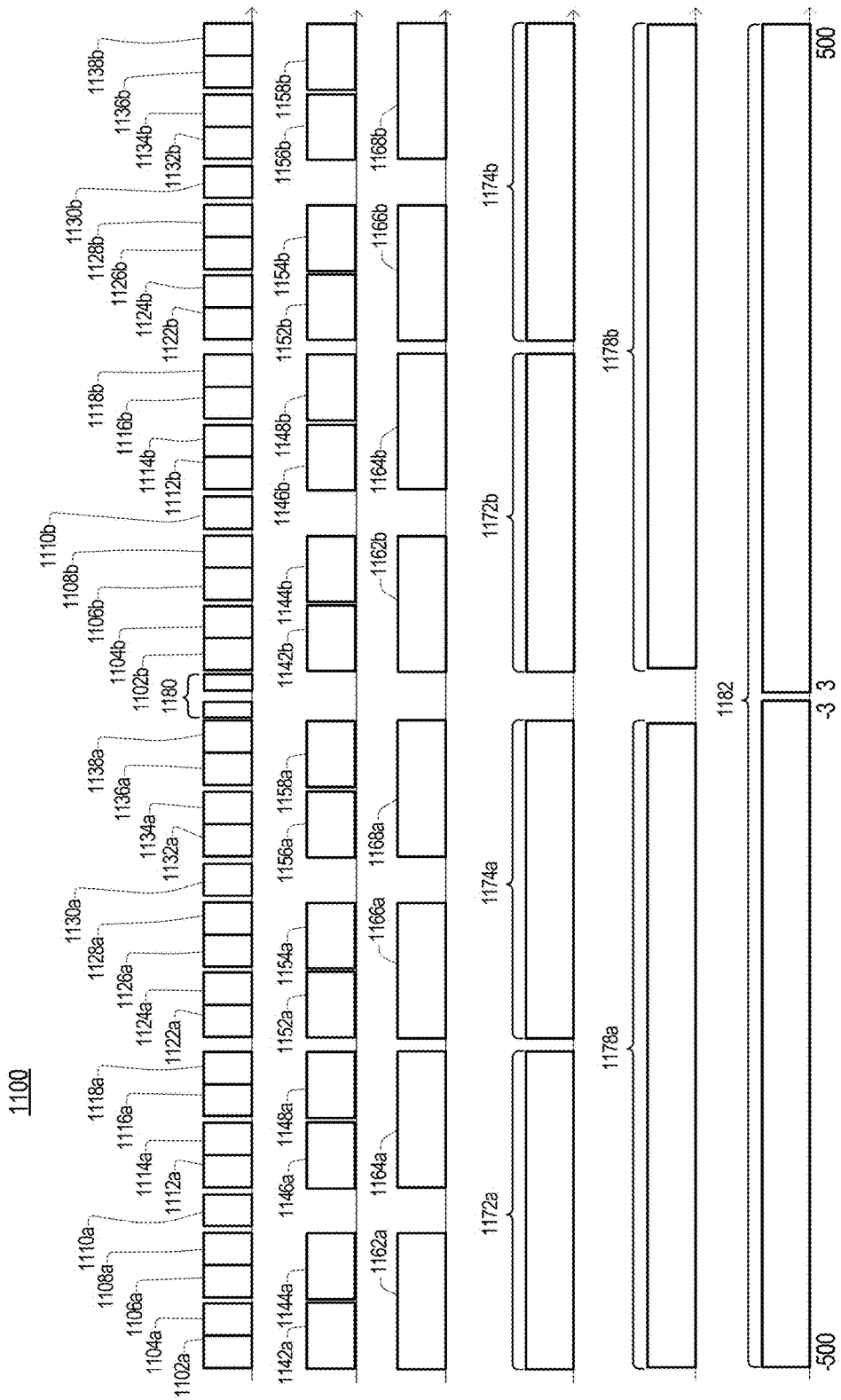
FIG. 11 illustrates RU definitions in an 80 MHz bandwidth, according to an embodiment.

FIG. 11 illustrates RU definitions in an 80 MHz bandwidth 1100 according to an embodiment. Within the 80 MHz bandwidth 1100 are defined:

- first to eighteenth 26-subcarrier RUs 1102a, 1104a, 1106a, 1108a, 1110a, 1112a, 1114a, 1116a, 1118a, 1122a, 1124a, 1126a, 1128a, 1130a, 1132a, 1134a, 1136a, and 1138a, each occupying approximately 2 MHz of the bandwidth of a left (lower) 40 MHz of the 80 MHz bandwidth 1100,
- a nineteenth 26-subcarrier RU 1180 occupying a center 2 MHz bandwidth of the 80 MHz bandwidth 1100,
- twentieth to thirty-seventh 26-subcarrier RUs 1102b, 1104b, 1106b, 1108b, 1110b, 1112b, 1114b, 1116b, 1118b, 1122b, 1124b, 1126b, 1128b, 1130b, 1132b, 1134b, 1136b, and 1138b, each occupying approximately 2 MHz of the bandwidth of a right (upper) 40 MHz of the 80 MHz bandwidth 1100,
- first to eighth 52-subcarrier RUs 1142a, 1144a, 1146a, 1148a, 1152a, 1154a, 1156a, and 1158a, each occupying approximately 4 MHz of the bandwidth of the left 40 MHZ,
- ninth to sixteenth 52-subcarrier RUs 1142b, 1144b, 1146b, 1148b, 1152b, 1154b, 1156b, and 1158b, each occupying approximately 4 MHz of the bandwidth of the right 40 MHZ,
- first to fourth 106-subcarrier RUs 1162a, 1164a, 1166a, and 1168a, each occupying approximately 8 MHz of the bandwidth of the left 40 MHZ,
- fifth to eighth 106-subcarrier RUs 1162b, 1164b, 1166b, and 1168b, each occupying approximately 8 MHz of the bandwidth of the right 40 MHZ,
- first and second 242-subcarrier RUs 1172a and 1174a, each occupying 20 MHz of the bandwidth of the left 40 MHZ,
- third and fourth 242-subcarrier RUs 1172b and 1174b, each occupying 20 MHz of the bandwidth of the right 40 MHZ,
- first and second 484-subcarrier RUs 1178a and 1178b occupying the left 40 MHz and the right 40 MHz, respectively, and
- a 996-subcarrier RU 1182 occupying 80 MHz of the bandwidth.

For the RUs of FIGS. 9, 10, and 11, a bandwidth being used to provide a 26- or 52-subcarrier RU in a PPDU may not be used to provide another RU in the PPDU. For example, if a 2 MHz bandwidth corresponding to first 26-subcarrier RU 902 is used to provide the first 26-subcarrier RU 902 in a 20 MHz PPDU, then the first 52-subcarrier RU 922, the first 106-subcarrier RU 932, and the 242-subcarrier RU 940 are not provided within the 20 MHz PPDU.

When beamforming is used to transmit a PPDU, a bandwidth being used to provide a 106-, 242, 484, or 996-subcarrier RU in the PPDU may not be used to provide another RU in the same beam but can be used to provide different RUs in different beams. When beamforming is not used, a bandwidth being used to provide the 106-, 242, 484, or 996-subcarrier RU in the PPDU may not be used to provide another RU.

A bandwidth allocation to stations (that is, an allocation of respective RUs to the stations) for a DL MU PPDU may be communicated in a SIG-B field. The SIG-B may have dynamic length in IEEE Std 802.11ax. When there are a large number of stations participating in a single MU session, the length of the SIG-B field may become very large. In embodiments, the length of the SIG-B field is reduced by compressing the allocation information included in the SIG-B field.

Figure 12:
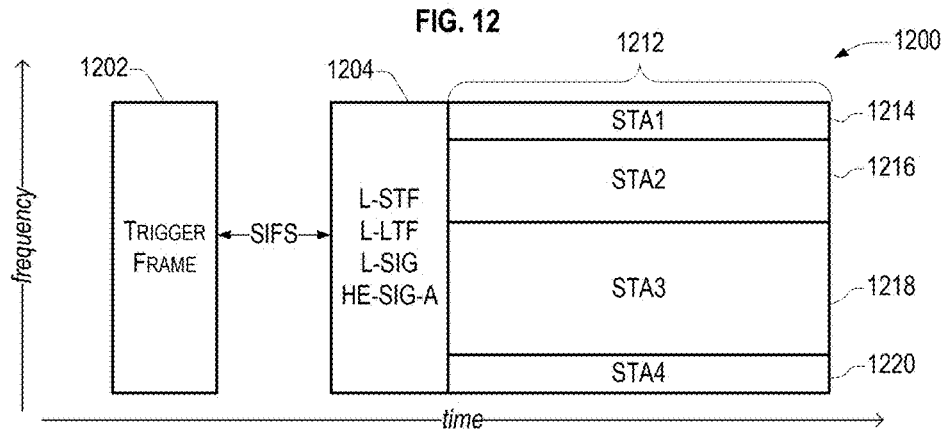
FIG. 12 illustrates an UL MU OFDMA communication, according to an embodiment.

FIG. 12 illustrates an UL MU communication exchange according to an embodiment. The sequence includes an UL MU PPDU 1200 and a trigger frame 1202. The UL MU PPDU 1200 may employ OFDMA, MU MIMO, or any combination thereof.

An AP initiates the UL MU communication by sending the trigger frame 1202 to a plurality of stations (here, first to fourth stations STA1 to STA4) associated with the AP. The trigger frame may also be referred to as an UL-Poll frame.

The trigger frame 1202 provides the stations participating in the UL MU communication with a time and frequency reference relative to the AP. The trigger frame 1202 also includes information regarding i) the stations that are expected to participate in the UL MU communication, ii) the respective bandwidth and sub-bands that the stations are to use when performing the UL MU communication, and iii) one or more PHY and MAC attributes that the stations shall follow.

An IFS interval (such as a SIFS) after the transmission of the last symbol of a PPDU including the trigger frame 1202, the stations designated in the trigger frame 1202 may simultaneously send their respective UL OFDMA frames (which frames are trigger-based frames) which air-combine (i.e., radio-frequency (RF) combined) to form the UL MU PPDU 1200.

The UL MU PPDU 1200 includes a first portion 1204 including an L-STF, an L-LTF, and an L-SIG field based on IEEE Std 802.11n and 802.11ac. The symbols in these fields make the UL MU PPDU 1200 compatible with legacy designs and products.

The L-STF, L-LTF, and L-SIG symbols of the first portion 1204 are modulated using a Fourier Transform (FT) size of 64 on a 20 MHz channel and are duplicated within each 20 MHz channel of the UL MU PPDU 1200 when the UL MU PPDU 1200 has a bandwidth wider than 20 MHz.

The first portion 1204 also includes an HE-SIG-A field. The symbols of the HE-SIG-A field may carry necessary information regarding each PSDU and regarding the RF, PHY, and MAC properties of the UL MU PPDU 1200.

In an embodiment, the HE SIG-A field of the first portion 1204 may be modulated using an FT size of 64. In another embodiment, the HE SIG-A field of the first portion 804 may be modulated using an FT size of 256.

The UL MU PPDU 1200 includes an MU payload region 1212. The MU payload region 1212 includes first, second, third, and fourth PSDUs 1214, 1216, 1218, and 1220 transmitted by the first, second, third, and fourth stations STA1, STA2, STA3, and STA4, respectively. Each PSDU 1214, 1216, 1218, and 1220 contains a respective payload from the respective station STA1, STA2, STA3, and STA4 plus necessary MAC padding and PHY padding. The PSDUs 1214, 1216, 1218, and 1220 are sub-band PSDUs.

Figure 13:
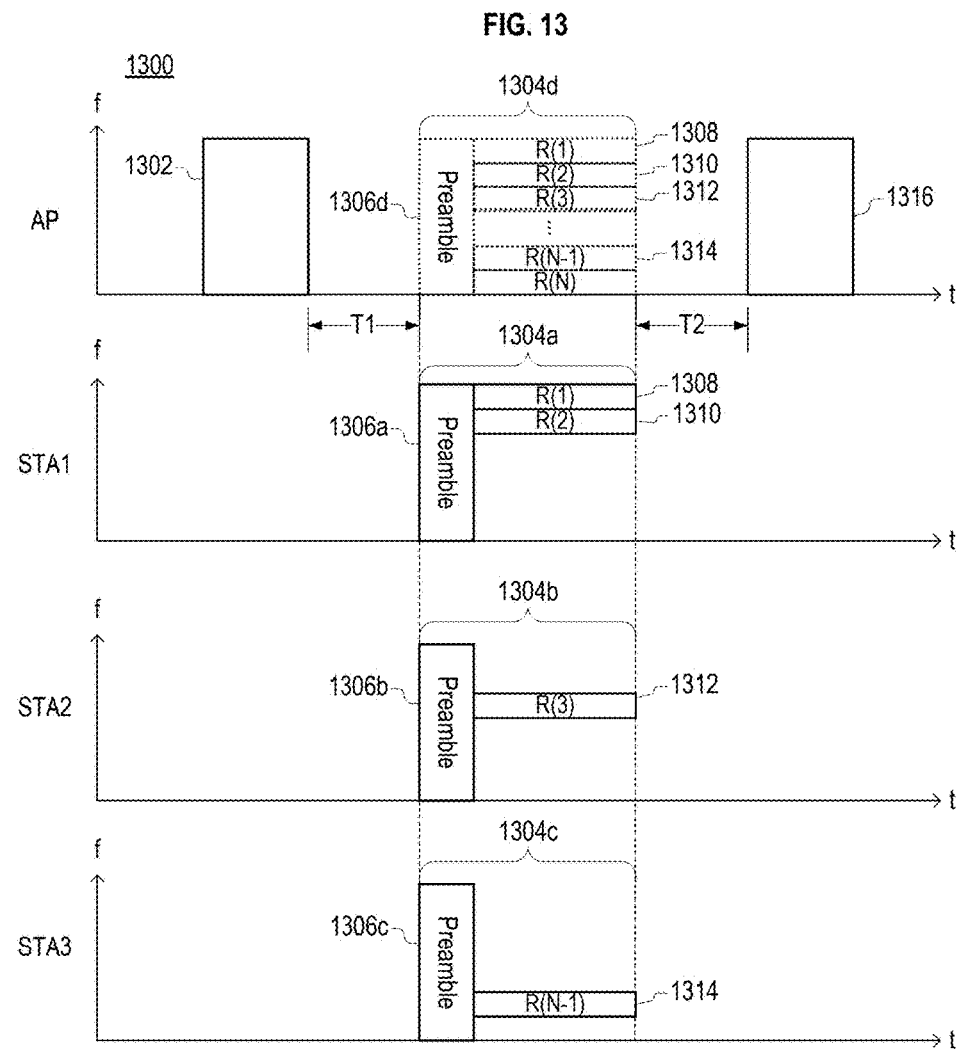
FIG. 13 illustrates an UL MU transmission including random access channels, according to an embodiment.

FIG. 13 illustrates a process 1300 for an UL MU transmission including one or more random access channels according to an embodiment.

In the process 1300, an AP sends a trigger frame 1302 to a plurality of stations, wherein the trigger frame 1302 indicates a first information for the immediately following UL OFDMA frame 1304, and wherein the first information comprises at least the following information:

- An allocated resource structure, here N allocatable resources R(1) to R(N).
- A mapping between stations and resource allocation units that is not 1-to-1, and thus allows more than one station within the plurality of stations to use a same resource for an UL MU transmission, at least for one or more resources.
- A transmission length.

In the example of FIG. 13, the mapping in the first information allocates the first and second resources R1 and R2 to a first station STA'. The other resources R(3) to R(N) are not allocated to a specific station and are therefore available for use for random access.

As a response to the first frame 1302, the first station STA1 transmits a first UL OFDMA frame 1304a a predetermined time T1 after receiving the first frame 1302. The first UL OFDMA frame 1304a comprising a first preamble 1306a and first and second payloads 1308 and 1310. The first preamble 1306a uses an entire bandwidth allocated to the UL OFDMA transmission by the AP. The first and second payloads 1308 use only the bandwidth of the first and second resource R(1) and R(2), respectively, that were allocated to the first station STA1.

As a response to the first frame 1302, other stations within the plurality of stations that have UL frames buffered send respective UL OFDMA frames using one of the resources R(3) to R(N) the predetermined time T1 after receiving the first frame 1302.

In FIG. 13, two of the other stations (the second station STA2 and the third station STA3) have buffered data for the UL transmission. The second station STA2 chooses to use a third resource R(3) to send its buffered data or information about its buffered data, and the third station STA3 chooses to use a fourth resource R(N−1) to send its buffered data or information about its buffered data.

The second station STA2 transmits a second UL OFDMA frame 1304b including a second preamble 1306b and a third payload 1312. The second preamble 1306b uses the entire bandwidth allocated to the UL OFDMA transmission by the AP and is the same as the first preamble 1306a. The third payload 1312 uses only the bandwidth of the third resource R(2).

The third station STA3 transmits a third UL OFDMA frame 1304c including a third preamble 1306c and a fourth payload 1314. The third preamble 1306c uses an entire bandwidth allocated to the UL OFDMA transmission by the AP and is the same as the first preamble 1306a. The fourth payload 1314 uses only the bandwidth of the fourth resource R(N−1).

The UL OFDMA frames 1304a, 1304b, and 1304c, along with any UL OFDMA frames sent by other stations in response to the first frame 1302, air-combine in the wireless channel to create the received UL OFDMA frames 1304d. The received UL OFDMA frames 1304c includes a received preamble 1306c that is identical to each of the first, second, and third preambles 1306a, 1306b, and 1306c. The received UL OFDMA frames 1304c includes a received payload comprised of the payloads 1308, 1310, 1312, and 1314 and any other payloads sent by other stations in response to the first frame 1302, when stations sending payloads choose respective different resources to send the respective payloads.

As a response to the receiving the received UL OFDMA frame 1304d from one or more of the stations, the AP sends back an acknowledgement frame 1314 a second predetermined time T2 after receiving the received UL OFDMA frame 1304c.

In another embodiment, an AP may send a trigger frame for random access such that there is no specific target receiver for the trigger frame. In response to the trigger frame, any station that meets the requirements for the random access channel will send a UL MU PPDU as an immediate response (after a predetermined time) to the trigger frame. The AP may check every allocated resource of the random access channel to determine whether any station has sent an UL MU PPDU in response to the trigger frame.

Embodiments include methods for use by stations, such as a non-AP station and an AP, that exchange frames in UL OFDMA and UL MU MIMO formats.

In UL MU in general and UL MU OFDMA specifically, an AP sends a Trigger frame to poll one or more specific stations to send their respective payload. Within the Trigger frame the AP schedules which stations are to use what sub-band(s) to send their payload to the AP. An operation in which the Trigger frame schedules a specific station to perform a transmission using one or more specific sub-bands may be referred to as a polling operation.

From time to time an AP may schedule a random access (RA) opportunity. For the RA opportunity, the AP schedules the sub-bands of an UL MU frame so that one or more of the sub-bands are not scheduled to a specific station and are available for RA. A Trigger frame that schedules an RA opportunity is an RA Trigger frame, which may also be referred to as a RAT frame. A single RAT frame may initiate only RA operations or both polling and RA operations.

Stations that intend to access the medium randomly select a sub-band from among the sub-bands available for RA and use the selected sub-band to transmit a payload as a response to the RA Trigger frame.

For both polling and random access processes, embodiments disallows stations to send specific frames in order to prevent the status of the wireless medium after the polling or random access operation from being either unfair, unreliable, or both. Embodiments also relate to Enhanced Distributed Channel Access (EDCA) operations during polling and random access phases.

Embodiments include processes for use with both polling and random access uplink transmission operations that disallow stations to send specific frames, in order to prevent the status of the wireless medium after the polling or random access operation from being either unfair, unreliable, or both.

Embodiments also include processes for managing EDCA operation during polling and random access uplink transmission operations.

When a station sends a frame in response to a Trigger or RA Trigger frame, it may send a control, management, or data frame. However, not all control frames should be allowed as a response to a Trigger or RA Trigger frame.

In an embodiment, the station transmits the response to the Trigger or RA Trigger frame without attempting to reserve the medium for its own use. Such reservation of the medium would normally be accomplished using, for example, an RTS/CTS exchange, or a CTS-to-Self frame.

In an embodiment, a station is disallowed from transmitting a response to a Trigger or RA Trigger frame when the response would attempt to reserve the medium or attempt to cancel a reservation of the medium. This prevents the station from transmitting, in response to a Trigger or RA Trigger frame, a control frame that could cause control of the medium to be possessed by the station instead of by the AP.

In an embodiment, an AP that receives a disallowed frame in response to a Trigger or RA Trigger frame ignores the disallowed frame.

Therefore, in some embodiments it is disallowed that a station sends a control frame in response to Trigger frame or RA Trigger frame such that it attempts to reserve the medium for the station.

In embodiments, the transmission of RTS frame in response to a Trigger or RA Trigger frame is disallowed. A STA shall not send an RTS frame in response to a Trigger frame or RA Trigger frame. In some embodiments, when a station sends an RTS frame in response to a Trigger or RA Trigger frame, the AP does not respond to the RTS frame. This rule exists because the transmission of an RTS frame is an attempt by the transmitter to reserve the medium for a duration of time, and the station is not allowed to perform such a reservation in response to a Trigger or RA Trigger frame because the AP has reserved the medium. When a station sends an RTS frame as a response to a Trigger or RA Trigger frame, the AP does not send a CTS response.

In embodiments, the transmission of CTS frame in response to a Trigger or RA Trigger frame, such as, for example, a CTS-to-Self frame, is disallowed. A STA shall not send a CTS frame in response to a RA Trigger frame. In some embodiments, when a STA sends a CTS frame in response to a RA Trigger frame, the AP does not respect the CTS frame and ignores the Network Allocation Vector (NAV) and the Transmitter Address (TA) of the CTS frame sender. This rule exists because the transmission of a CTS frame or CTS-to-Self frame is an attempt by the transmitter to reserve the medium for a duration of time, and this is not allowed. When an AP receives a CTS or CTS-to-Self frame in response to a Trigger or RA Trigger frame, the AP shall refrain from or abandon performing any procedure that the AP usually performs in response to a CTS frame.

In embodiments, the transmission of a CF-End frame in response to a Trigger or RA Trigger frame is disallowed. A station shall not send a CF-End frame in response to a RA Trigger frame. In some embodiments, when a station sends a CF-End frame in response to a Trigger or RA Trigger frame, the AP shall not respect the CF-End frame and shall refrain from or abandon performing any procedure that the AP usually performs in response to a CF-End frame.

In embodiments, the transmission of a Null Data Packet Announcement (NDPA) frame in response to a Trigger or RA Trigger frame is disallowed. A STA shall not send an NDPA frame in response to a Trigger frame or RA Trigger frame. In some embodiments, when a station sends an NDPA frame in response to a Trigger frame or RA Trigger frame, the AP does not respond to the NDPA frame. This rule exists because the transmission of an NDPA frame is an attempt by the transmitter to reserve the medium for a duration of time to perform a sounding procedure, such as by subsequently sending a Null Data Packet (NDP) frame, and this is not allowed. As a result, the NDP transmission is not guaranteed.

Figure 14:
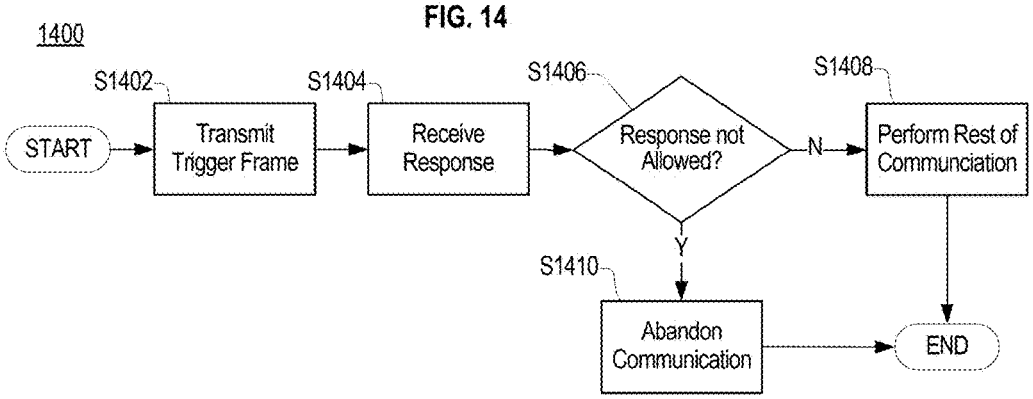
FIG. 14 illustrates a process for performing an UL communication, according to an embodiment.

FIG. 14 illustrates a process 1400 for performing an UL communication, according to an embodiment. The process 1400 abandons the UL communication when a disallowed response is received in response to a Trigger or RA Trigger frame.

At S1402, the process 1400 transmits a Trigger frame. In an embodiment, the Trigger frame may be an RA Trigger frame.

At S1404, the process 1400 receives a response to the Trigger frame transmitted in S1402. The response may be a frame transmitted an SIFS after the end of the Trigger frame.

At S1406, the process 1400 determines whether the response is not an allowed response. The process 1400 proceeds to S1410 when the response is not an allowed response, and proceeds to S1408 when the response is an allowed response.

In an embodiment, the response is not an allowed response when the response includes an RTS frame. In an embodiment, the response is not an allowed response when the response includes a CTS frame or a CTS-to-Self frame. In an embodiment, the response is not an allowed response when the response includes a CF-End frame. In an embodiment, the response is not an allowed response when the response includes a Null Data Packet Announce (NDPA) frame.

At S1408, the process 1400 performs the remainder of the UL communication. The process 1400 then ends.

At S1410, the process 1400 abandons performance of the UL communication. In an embodiment, an AP performing the process 1400 ignores NAV and TA information in the response when the UL communication is abandoned. The process 1400 then ends.

EDCA supports four Access Categories (ACs) for traffic: Background (AC_BK), Best Effort (AC_BE), Video (AC_VI), and Voice (AC_VO). Each of the ACs has an associated EDCA backoff timer and an associated queue. Generally, a station initializes an EDCA backoff timer to a random value when the associated AC queue has information to transmit. When the medium becomes idle and the appropriate IFS time has elapsed, the station decrements each non-zero EDCA backoff timer by one for every slot time that passes.

If another station begins transmitting before any of the backoff timers associated with non-empty queues have reached zero, the station defers access until the medium is available again, at which time the station continues decrementing the backoff timers associated with the non-empty queues from where it previously left off. Once a backoff timer associated with non-empty queue reaches zero, the station is allowed to transmit a frame associated with the AC associated with the backoff timer.

However, when a station sends a frame, such as a frame associated with an AC, in response to a Trigger frame or a RA Trigger frame, the EDCA backoff timers are not used to contend for access to the medium.

Embodiments include a plurality of processes for updating the EDCA backoff timers when a station responds to a Trigger or RA Trigger frame. Embodiments provide fair access to the medium for each of the ACs.

In some embodiments, a station freezes the backoff timers until the end of the polling or RA period (that is, the end of the duration that is reserved by the Trigger frame or RA Trigger frame, the end of the duration being indicated using, for example, a duration value appearing in the MAC header of the Trigger or RA Trigger frame). When a station transmits an MSDU associated with an AC as part of an RA communication, the end of the polling or RA period may be indicated by the successful reception of an acknowledgment frame sent in response to the transmission of the MSDU.

In some embodiments, a station resets the corresponding backoff timer for an AC when all or some of the pending MSDUs of the AC are sent in response to the Trigger or RA Trigger frame and there are no more pending MSDUs for the AC.

In some embodiments, a station invokes a new backoff timer for an AC when some or all of the pending MSDUs of the AC are sent in response to the Trigger or RA Trigger frame and there is one or more pending MSDU for that AC.

In some embodiments, when a station transmits some or all of the pending MSDUs from a selected AC in response to a Trigger or RA Trigger frame, the station adjusts the backoff timer of the other ACs to lower values in order to maintain fairness.

In some embodiments, the backoff timers of the other ACs are decreased by the value of the backoff counter of the selected AC, except that any backoff counter that would be decreased below zero is set to zero instead, as shown in Equation 1, below, wherein for $\forall x \in \{AC\text{-}VI, AC\text{-}VO, AC\text{-}BE, AC\text{-}BK\}$, $$BC[x] = \begin{cases} BC[x] - BC[s], & BC[s] < BC[x] \\ 0, & BC[s] \geq BC[x] \end{cases} \quad \text{Equation 1}$$

where BC[i] is a value of a backoff counter of AC 'i' and s is the selected AC.

Figure 15A:
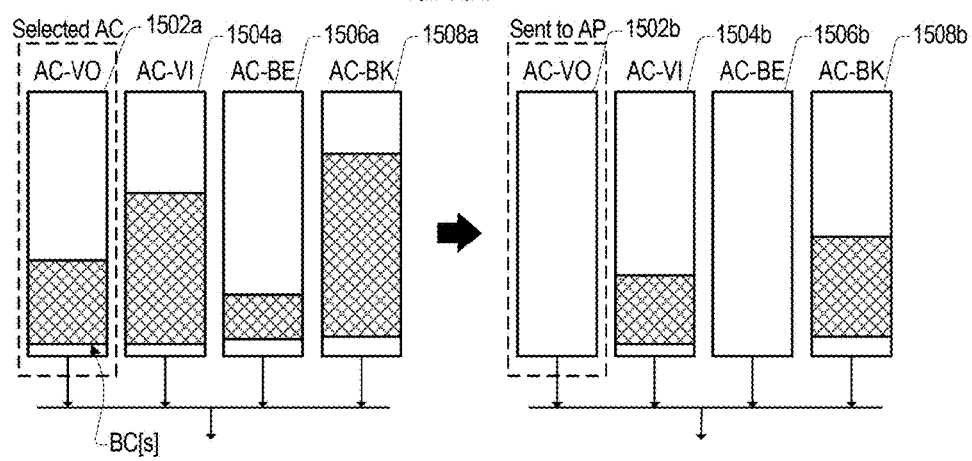
FIG. 15A shows Enhanced Distributed Channel Access (EDCA) backoff counter values before and after transmission of an MAC Service Data Units (MSDU) of an Access Category (AC), according to an embodiment.

FIG. 15A shows an example of values of the EDCA backoff counters before and after a selected AC sends an MSDU to the AP in response to a Trigger or RA Trigger frame, according to the embodiment of Equation 1. The values of the backoff counters for the AC-VO, AC-VI, AC-BE, and AC-BK categories before the transmission of a response to the Trigger or RA Trigger frame are respectively represented by the shaded regions of first to fourth pre-response columns 1502a, 1504a, 1506a, and 1508a. The values of the backoff counters for the AC-VO, AC-VI, AC-BE, and AC-BK categories after the transmission of the response to the Trigger or RA Trigger frame are respectively represented by the shaded regions of first to fourth post-response columns 1502b, 1504b, 1506b, and 1508b.

In the example shown, the AC-VO category is selected and a frame of the AC-VO category is transmitted. As a result, each of the backoff counters having a value greater than the pre-response value BC[s] of the backoff counter for the AC-VO category is decremented by the value BC[s], and each of the backoff counters having a value less than or equal to the value BC[s] is set to zero.

In some other embodiments, all of the EDCA backoff timers are decreased by the minimum of the non-zero backoff timer values among ACs having non-empty associated queues, as shown in Equation 2, below, wherein for $\forall x \in \{AC\text{-}VI, AC\text{-}VO, AC\text{-}BE, AC\text{-}BK\}$, $$BC[x] = \begin{cases} BC[x] - \text{Min}BC, & \text{Min}BC < BC[x] \\ 0, & \text{Min}BC \geq BC[x] \end{cases} \quad \text{Equation 2}$$

where MinBC is the value of the EDCA backoff timer having the smallest non-zero value.

Figure 15B:
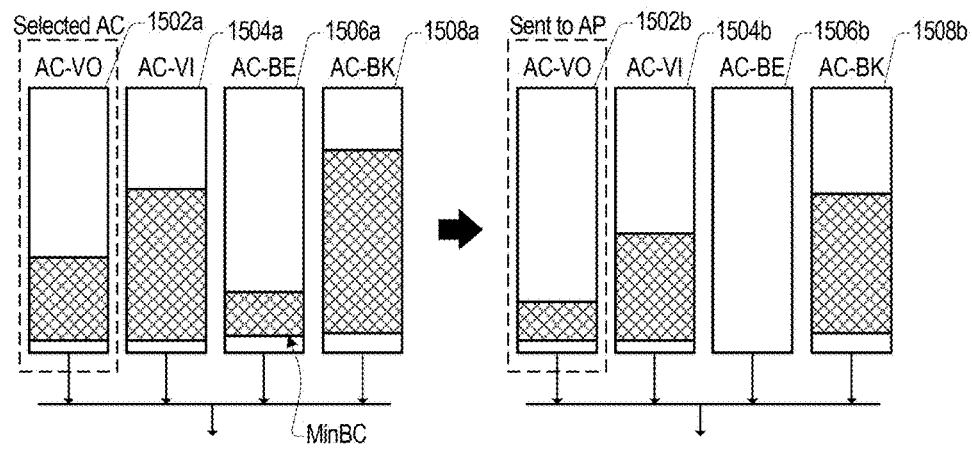
FIG. 15B shows EDCA backoff counter values before and after transmission of an MSDU of an AC, according to another embodiment.

FIG. 15B shows an example of values of the EDCA backoff counters before and after a selected AC sends an MSDU to the AP in response to a Trigger or RA Trigger frame, according to the embodiment of Equation 2. The values of the backoff counters for the AC-VO, AC-VI, AC-BE, and AC-BK categories before the transmission of a response to the Trigger or RA Trigger frame are respectively represented by the shaded regions of first to fourth pre-response columns 1502a, 1504a, 1506a, and 1508a. The values of the backoff counters for the AC-VO, AC-VI, AC-BE, and AC-BK categories after the transmission of the response to the Trigger or RA Trigger frame are respectively represented by the shaded regions of first to fourth post-response columns 1502b, 1504b, 1506b, and 1508b.

In the example shown, the AC-VO category is selected and a frame of the AC-VO category is transmitted. A minimum pre-response value of the backoff counters MinBC is determined, being the value of the backoff counter for the AC-BE category in the example shown. Each of the backoff counters having a value greater than the minimum pre-response value MinBC is decremented by the minimum pre-response value MinBC, and each of the backoff counters having a value less than or equal to the minimum pre-response value MinBC is set to zero.

For both polling and RA procedures, embodiments disallows stations to send specific control frames. Disallowing the specific control frames is done to ensure that the status of the wireless medium after the polling or random access phase would still be under the control of the AP or the station that has started the polling or RA period, in order to prevent access to the medium from being either unfair, unreliable, or both.

Embodiments also include processes for EDCA operation during polling and random access phase that promote fair access to the medium.

Embodiments include forms of Trigger and RA Trigger frames where each form of the Trigger or RA Trigger frame causes some stations to participate in forming the immediately next UL OFDMA PPDU, within which UL OFDMA PPDU some stations send special control or management frames and some other stations send data frames.

In some embodiments, an AP might not specifically assign some or all of the sub-bands or resource units (RU) of an UL OFDMA PPDU to respective stations, and may allow all or a subset of the stations associated with the AP to attempt to participating in forming the UL OFDMA PPDU using those sub-bands or RUs that are not assigned to a specific station. This process is referred to as Random Access (RA) process, and a frame that triggers an UL OFDMA PPDU that supports the RA process is called an RA Trigger (or RAT) frame.

In some embodiments, when a Trigger or RA Trigger frame allocates all the RUs of a subsequent UL PPDU for RA, the AP uses a reserved AID, indicated herein by AID0, to announce that all stations may access the RUs assigned for RA. In an embodiment, the AP also indicates a unit bandwidth of the RUs that can be used for RA in a RABW subfield within a common-info part of the Trigger or RA Trigger frame, such as a common info part of an HE-SIG-B field of the Trigger or RA Trigger frame. For example, the RABW subfield in the common-info part may indicate that the unit bandwidth for RA is 2 MHz.

In an embodiment, the RABW subfield in the common-info part includes 2-bits. The 2 bits of the RABW are interpreted as follows: 00 indicates a 2 MHz bandwidth (or 26-tone RU) for RA, 01 indicates a 4 MHz bandwidth (or 52-tone RU) for RA, 10 indicates an 8 MHz bandwidth (or 106-tone RU) for RA, and 00 indicates a 20 MHz bandwidth for RA.

In another embodiment, the RABW subfield in the common-info part includes 1 bit. The 1 bit of the RABW subfield is interpreted as follows: 0 indicates a 2 MHz bandwidth (or 26-tone RU) for RA and 1 indicates a 4 MHz bandwidth (or 52-tone RU) for RA.

In an embodiment, a Trigger frame includes a common Info field and a per-station Info fields. Per-station info fields are also referred to as Per-User Info fields, User Info fields, and per-STA Info fields. The per-station info field includes the following PHY and MAC attribute subfields: AID12 (identification of the STA), RU Allocation (an index of an RU within a PPDU, the RU having a bandwidth that is known via an earlier indication), Coding Type, MCS, DCM, SS Allocation, Target RSSI, and Trigger Dependent User Info. The Common Info field includes the following PHY/MAC or behavioral attributes: Trigger Type, Length, Cascade Indication, CS Required, BW, GI and LTF Type, MU-MIMO LTF Mode, Number Of HE-LTF Symbols, STBC, LDPC Extra Symbol, AP TX Power, Packet Extension, Spatial Reuse, Doppler, HE-SIG-A Reserved, Reserved bits, and Trigger Dependent Common Info.

The AP indicates the RUs that can be used for RA by setting an RU index in a per-station info field of the Trigger or RA Trigger frame to a reserved value, denoted as RU0. The per-station info field may be a per-station info field of the Trigger or RA Trigger frame. As a result, any or all of the RUs within a bandwidth of the Trigger or RA Trigger frame and having the bandwidth indicated by the RABW subfield in the common-info part can be used for RA. A single per-station info could be used to indicate that all RUs within the bandwidth of the Trigger or RA Trigger frame can be used for RA.

An RU within a bandwidth of the Trigger or RA Trigger frame refers to an RU in the UL MU OFDMA frame sent in response to the Trigger or RA Trigger frame that is within a same bandwidth as the bandwidth used by the Trigger or RA Trigger frame. For example, if an RA Trigger frame is transmitted using a secondary 20 MHz channel of a 40 MHz DL transmission, then an RU within a bandwidth of the RA Trigger frame is an RU in the secondary 20 MHz channel of the UL MU OFDMA frame sent in response to the RA Trigger frame.

Figure 16:
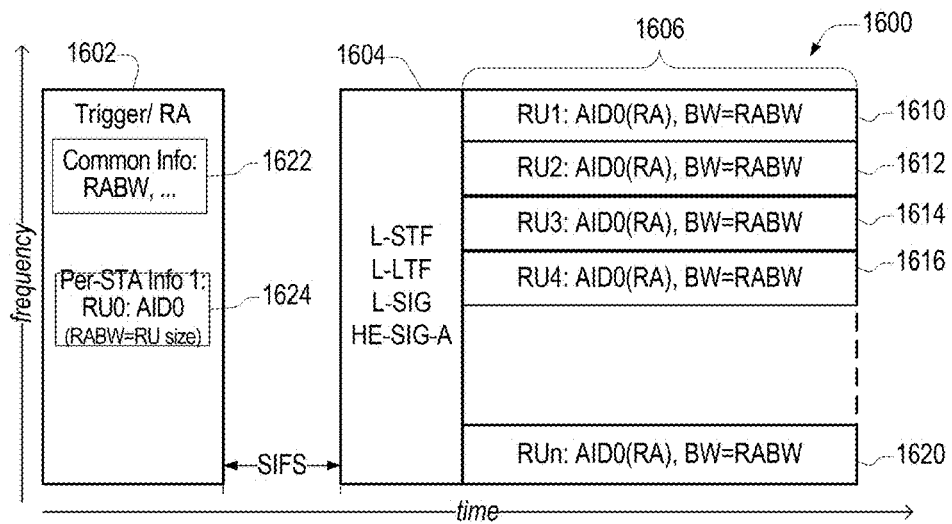
FIG. 16 illustrates a Random Access (RA) Trigger frame and a corresponding UL OFDMA PPDU, according to an embodiment.

FIG. 16 shows an example of an RA Trigger frame 1602 and a corresponding UL OFDMA PPDU 1600, according to an embodiment. The RA Trigger frame 1602 includes a common info part 1622 that includes an RABW field. The RA Trigger frame 1602 also includes a first per-station (per-STA) info part 1624.

The first per-station info part 1624 includes RU scheduling information wherein the RU being scheduled is identified by the reserved value RU0 and the station that the RU is scheduled to be used by is identified by the reserved AID AID0. This indicates that all of the not-otherwise-scheduled RUs within the bandwidth of the RA Trigger frame 1602 and having a bandwidth equal to the bandwidth indicated by the RABW field can be used for RA. Here, where no other RU scheduling information is included in the RA Trigger frame 1602, this indicates that all of the RUs within the bandwidth of the RA Trigger frame 1602 and having a bandwidth equal to the bandwidth indicated by the RABW field can be used for RA.

The UL MU PPDU 1600 includes a first portion 1604 including an L-STF, an L-LTF, and an L-SIG field based on IEEE Std 802.11n and 802.11ac. The symbols in these fields make the UL MU PPDU 1600 compatible with legacy designs and products.

The first portion 1604 also includes an HE-SIG-A field. The symbols of the HE-SIG-A field may carry necessary information regarding each PSDU and regarding the RF, PHY, and MAC properties of the UL MU PPDU 1600.

The UL MU PPDU 1600 includes an MU payload region 1606. The MU payload region 1606 includes first, second, third, and fourth through $n^{th}$ RUs 1610, 1612, 1614, and 1616 through 1620, respectively, each having a bandwidth equal to the bandwidth indicated by the RABW field of the RA Trigger field 1602. All of the RUs in the MU payload region 1606 are indicated, by the RA Trigger frame 1602, as being available for use for RA.

In some embodiments, when an RA Trigger frame 1602 allocates some of the RUs of the corresponding UL OFDMA PPDU 1600 for RA, a reserved AID, indicated by AID0, is used to announce that all stations or a specific set of the stations (e.g. associated stations, or unassociated stations) which receive the RA Trigger frame 1602 may use the RUs assigned for RA in the UL OFDMA PPDU 1600. A bandwidth of the RUs that can be used for RA in the UL OFDMA PPDU 1600 is indicated in a RABW field within a common-info part of the RA Trigger frame 1602, such as a common info part of the RA Trigger frame. For example, the common-info may indicate that the unit bandwidth for RA in the UL OFDMA PPDU 1600 is 2 MHz (or equivalently 26-tone RUs). In an embodiment, the RABW (and the bandwidth of all the RA RUs within the Trigger frame) is equal to a size of an RU that is indicated in the RU Allocation subfield in the Per-User Info where its AID field equals AID0.

The AP indicates which RUs can be used for RA in the UL OFDMA PPDU 1600 by setting an RU index in a per-station info field of the RA Trigger frame, such as a per-station info field of the RA Trigger frame, to a reserved value, denoted as RU0, or to an RU index as described below. This would indicate that all RUs that are 1) within the bandwidth of the RA Trigger frame,
2) have not been assigned or had all or part of their bandwidth assigned to other stations in other per-station info fields within the RA Trigger frame, and
3) that have a bandwidth equal to the bandwidth indicated in the RABW field can be used for RA. Such RUs are referred to as left-over RUs, and a station reads all per-station info fields in the RA Trigger frame 1602 to determine which, if any, RUs have been left-over for RA in the UL OFDMA PPDU 1600.

In another embodiment, there may not be a RABW field, and instead the bandwidth of all the RA RUs allocated by a Trigger frame is equal to the bandwidth of an RU that is indicated in the RU Allocation subfield when the AID field of a Per-User Info field corresponding to the RU equals AID0.

Figure 17:
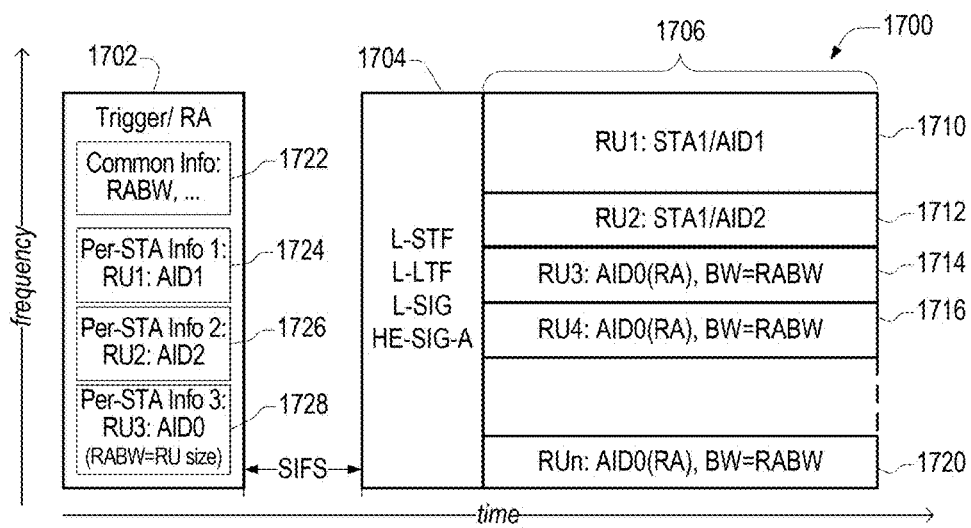
FIG. 17 illustrates a RA Trigger frame and a corresponding UL OFDMA PPDU, according to an embodiment.

FIG. 17 shows an example of an RA Trigger frame 1702 and a corresponding UL OFDMA PPDU 1700, according to an embodiment. The RA Trigger frame 1702 includes a common info part 1722 that includes an RABW field. The RA Trigger frame 1702 includes first, second, and third per-station info parts 1724, 1726, and 1728, respectively.

The first per-station info part 1724 includes RU scheduling information that indicates that a first RU RU1 is scheduled for use by a first station STA1 having a first AID AID1. The second per-station info part 1726 includes RU scheduling information that indicates that a second RU RU2 is scheduled for use by a second station STA2 having a second AID AID2. The third per-station info part 1728 includes RU scheduling information in which the RU being scheduled is identified by the reserved value RU0 and the station that the RU is scheduled to be used by is identified by the reserved AID AID0. The third per-station info part 1728 indicates that all of the not-otherwise-scheduled RUs that 1) are within the bandwidth of the RA Trigger frame 1702,
2) have not had all or part of their bandwidth assigned to a specific station by an assignment of some other RU, and
3) have a bandwidth equal to the bandwidth indicated by the RABW field can be used for RA in the UL OFDMA PPDU 1700.

The UL MU PPDU 1700 includes a first portion 1704 including an L-STF, an L-LTF, and an L-SIG field based on IEEE Std 802.11n and 802.11ac. The first portion 1704 also includes an HE-SIG-A field. The symbols of the HE-SIG-A field may carry necessary information regarding each PSDU and regarding the RF, PHY, and MAC properties of the UL MU PPDU 1700.

Figure 18:
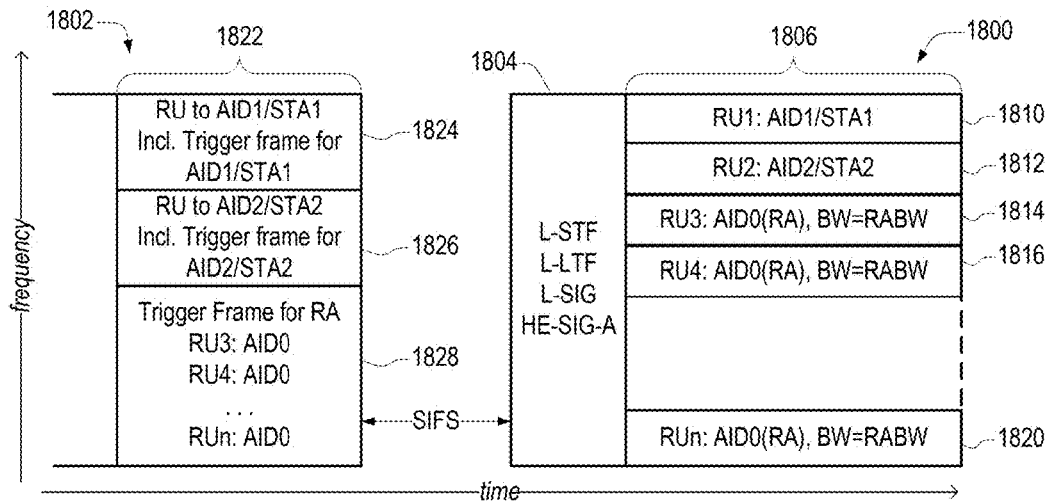
FIG. 18 illustrates allocation of RUs in a UL MU PPDU by Trigger and RA Trigger frames of a DL MU PPDU, according to an embodiment.

The UL MU PPDU 1700 includes an MU payload region 1706. The MU payload region 1706 includes first, second, third, and fourth through $n^{th}$ RUs 1710, 1712, 1714, and 1716 through 1720, respectively. The first RU 1710 (RU1) is scheduled for use by the first station STA1 having the first AID AID1. The second RU 1712 (RU1) is scheduled for use by the second station STA2 having the second AID AID2. The bandwidths of the first RU 1710 and the second RU 1712 may each be the same or different from the bandwidth indicated by the RABW field. The third and fourth through $n^{th}$ RUs 1714 and 1716 through 1720 (RU3 and RU4 through RUn), respectively, each have a bandwidth equal to the bandwidth indicated by the RABW field of the RA Trigger field 1702. The third and fourth through $n^{th}$ RUs 1714 and 1716 through 1720, respectively, are indicated by the RA Trigger frame 1702 as being available for use for RA in the UL OFDMA PPDU 1700. While RA RUs shown in FIG. 17 (1714-1720) and FIG. 18 are consecutive RUs, it is a mere example and in general the RA RUs may not be consecutive RUs. In an embodiment, the RA RUs may be consecutive but limited to one of the 20 MHz channels e.g. the secondary 20 MHz channel, or limited to one of the 40 MHz channels e.g. the secondary 40 MHz channel.

In some embodiments the RABW information is included within one or more of the per-station info parts 1724, 1726, and 1728. In some embodiments the RABW information is included both within the common info part 1722 and within one or more of the per-station info parts 1724, 1726, and 1728. In another embodiment, the RABW (and the bandwidth of all the RA RUs indicated by the Trigger frame) is equal to the size of an RU that is indicated in the RU Allocation subfield wherein the Per-User Info corresponding to the RU has its AID field equals AID0, e.g. per-station info parts 1728.

As shown in FIGS. 16 and 17, a single per-station info field could be used to indicate that all RUs in an UL OFDMA PPDU (FIG. 16) or all qualified RUs in an UL OFDMA PPDU that are not specifically allocated (FIG. 17) are available for RA in the UL OFDMA PPDU use by setting AID0 (and in some embodiments RU0) within a per-STA info part and setting RABW within a common-info part of an RA Trigger frame to which the UL OFDMA PPDU is a response. In other embodiments, there may not be a RABW field, and instead the bandwidth of each of the RA RUs indicated by the Trigger frame is equal to the size of the RU that is indicated in the RU Allocation subfield when the Per-User Info corresponding to that RU has its AID field equals AID0.

In some embodiments, there is no per-station info explicitly indicating which RUs are available for RA in the subsequent UL OFDMA PPDU. In such an embodiment, an RA Trigger frame corresponding to the RA Trigger frame of FIG. 17 would not need to include a third per-station info part. In such an embodiment, a receiving station decodes and analyzes the per-station info and determines which RUs have been specifically assigned to stations in order to determine which RUs are available for RA in the subsequent UL OFDMA PPDU. The receiving station determines from the assigned RUs which RUs are left-over RUs. The receiving station determines the value of RABW field included in the common-info field, and determines the unit bandwidth for RA in the subsequent UL OFDMA PPDU from the value of RABW field. In an embodiment, the RABW field also includes information on how much of the bandwidth available for the UL OFDMA transmissions is available for RA in the subsequent UL OFDMA PPDU. The receiving station determines which of the left-over RUs are available for RA in the subsequent UL OFDMA PPDU using the information from the RABW field.

In some embodiments, RABW might have a reserved value, such as all-zero, that indicates that there is no RU allocated for RA in an UL OFDMA PPDU by the RA Trigger frame to which the UL OFDMA PPDU is a response. The RABW being some other value, such as a non-zero value, indicates that there is at least one RU allocated for RA in the UL OFDMA PPDU by the RA Trigger frame, and in an embodiment also indicates the unit bandwidth for RA in the UL OFDMA PPDU.

For example, in an embodiment, the RABW is a 2-bit field, and the RABW having a value of 00 in a Trigger frame indicates that there is no RU allocated for RA in the UL OFDMA PPDU transmitted in response to the Trigger frame. The RABW having values of 01, 10, and 11 respectively indicates that the unit BW for RA is 2 MHz (26-tone RUs), 4 MHz (52-tone RUs), and 8 MHz (106-tone RUs), and that there is at least one RU allocated for RA in the UL OFDMA PPDU transmitted in response to the Trigger frame (which Trigger frame would therefore be an RA Trigger frame).

In another example embodiment, the RABW is a 3-bit field, and the RABW having a value of 000 in a Trigger frame indicates that there is no RU allocated for RA in the UL OFDMA PPDU transmitted in response to the Trigger frame. The RABW having values of 001, 010, 011, and 100 respectively indicate that the unit BW for RA in the subsequent UL OFDMA PPDU is 2 MHz, 4 MHz, 8 MHz and 20 MHz, and other values are reserved. The RABW having values of 001, 010, 011, or 100 also indicates that there is at least one RU allocated for RA in the UL OFDMA PPDU.

In some embodiments, instead of using a single predefined AID0 value that indicates that all associated stations may use one or more RUs for RA in the subsequent UL OFDMA PPDU, an AP uses other AID values to restrict the RA access. For example, in an embodiment, the AP uses one or more AID values with a mask, and stations that have AID that have a predetermined set of bits that match the corresponding bits of an AID announced in an RA Trigger Frame are eligible to participate in the RA in the UL OFDMA PPDU transmitted in response to the RA Trigger frame.

This form of AID masking is possible when the AP announces within the RABW sub-field that the Trigger frame has allocated one or more RUs to RA. When the AP indicates a value for RABW other than a reserved value that indicates no RUs are allocated to RA in the subsequent UL OFDMA PPDU (such as the all-zero RABW value described in previous examples), a receiving station would determine whether the station's AID matched, using a pre-determined mask, the AID announced within a per-station info in the Trigger or RA Trigger frame that carries information on RA in the subsequent UL OFDMA PPDU, according to Equation 3:

$$RA_{ALLOWED} = (AID_{ANN} = MASK \:\&\&\: AID_{STA})$$  Equation 3 wherein $AID_{ANN}$ is the AID announced in the per-station info that carries the information on RA in the subsequent UL OFDMA PPDU, "=" means "is identical to," MASK is the predetermined mask, "&&" is a bitwise-AND operator, and $AID_{STA}$ is the AID of the receiving station.

For example, in an embodiment, when the value for RABW indicates that an RU is allocated to RA in the subsequent UL OFDMA PPDU, the predetermined mask is (in binary) 11111111010, and the announced AID is 00000001010, then receiving stations having respective AIDs equal to 00000001010, 00000001011, 00000001110, or 00000001111 would be permitted to use the RU allocated to RA, and other stations would not.

In some embodiments, multiple predetermined AIDs are used to indicate RUs that are available for RA (e.g. AID0, AID1, AID2 . . . ) in a subsequent UL OFDMA PPDU, where none of these predetermined AIDs are the AID of a specific station. Instead the predetermined AIDs are a group identification for all or a subset of the stations receiving an RA Trigger frame.

For example, in an embodiment, a first predetermined AID AID0 is used to indicate all associated and unassociated stations, a second predetermined AID AID1 is used to indicate all associated stations, and a third predetermined AID AID2 is used to indicate all unassociated stations (that is, that are unassociated to the AP transmitting the Trigger or RA Trigger frame) that are not associated to any APs.

In some embodiments, RA in a UL OFDMA PPDU transmitted in response to an RA Trigger frame is restricted to stations that are associated to the AP transmitting the RA Trigger frame (including stations associated to any BSSID of a MultiBSS AP).

In some embodiments, RA in a UL OFDMA PPDU transmitted in response to an RA Trigger frame is restricted to the stations that are associated to the AP transmitting the Trigger or RA Trigger frame (including stations associated to any BSSID of a MultiBSS AP) and the stations that are not associated to any AP.

In some embodiments, stations that are unassociated to the AP transmitting an RA Trigger frame and are associated to one more other APs are allowed to participate in RA in a UL OFDMA PPDU transmitted in response to the RA Trigger frame in order send 1) a probe request, 2) an association request or other management frame required in the early stage of discovery of an AP or association to an AP, or 3) one or more management frames that are required in the service discovery stage.

In some embodiments, a Trigger frame is sent within a DL MU frame and allocates one or more RUs for RA in an UL OFDMA PPDU transmitted in response to the Trigger frame. In an embodiment, the AP uses a per-station info field to announce each RU that is available for RA in the subsequent UL OFDMA PPDU. Within each such per-station info field the AP indicates an AID of AID0 or another RA-indicating AID, such as mentioned above, to indicate RA. The RU allocated to RA is specifically announced within each respective per-station info field.

FIG. 18 illustrates allocation of RUs in a subsequent UL MU PPDU 1800 by Trigger and RA Trigger frames of a DL MU PPDU 1802 according to such an embodiment. The DL MU PPDU 1802, shown in part, includes a payload portion 1822. The UL MU PPDU 1800 includes a first portion 1804 including L-STF, L-LTF, and L-SIG fields based on IEEE Std 802.11n and 802.11ac and an HE-SIG-A field. The UL MU PPDU 1800 also includes an MU payload region 1806.

The payload portion 1822 of the DL MU PPDU 1802 includes first, second, and third DL RUs 1824, 1826, and 1828, respectively. The MU payload region 1806 of the UL MU PPDU 1800 includes first, second, third, and fourth through $n^{th}$ UL RUs 1810, 1812, 1814, and 1816 through 1820, respectively.

The first DL RU 1824 is to be received and decoded by a first station STA1 having a first AID AID1. The second DL RU 1824 is to be received and decoded by a second station STA2 having a second AID AID2. The third DL RU 1828 is a broadcast RU that is to be received and decoded by all the receiving stations, or in some embodiments by all of the receiving stations except STA1 and STA2 due to implementation considerations.

The first DL RU 1824 includes a first trigger frame addressed to the first station STA1 that allocates the first UL RU 1810 to the first station STA1. The second DL RU 1826 includes a second trigger frame addressed to the second station STA2 that allocates the second UL RU 1812 to the second station STA2.

The third DL RU 1828 includes an RA Trigger frame addressed to one or more of the stations receiving the DL MU PPDU 1802. The RA Trigger frame includes per-station info for each of the third and fourth through $n^{th}$ UL RUs 1814 and 1816 through 1820 allocating those RUs to RA. Each of the third and fourth through $n^{th}$ UL RUs 1814 and 1816 through 1820 has a bandwidth determined according to a value of an RABW field in the RA Trigger frame.

Figure 19:
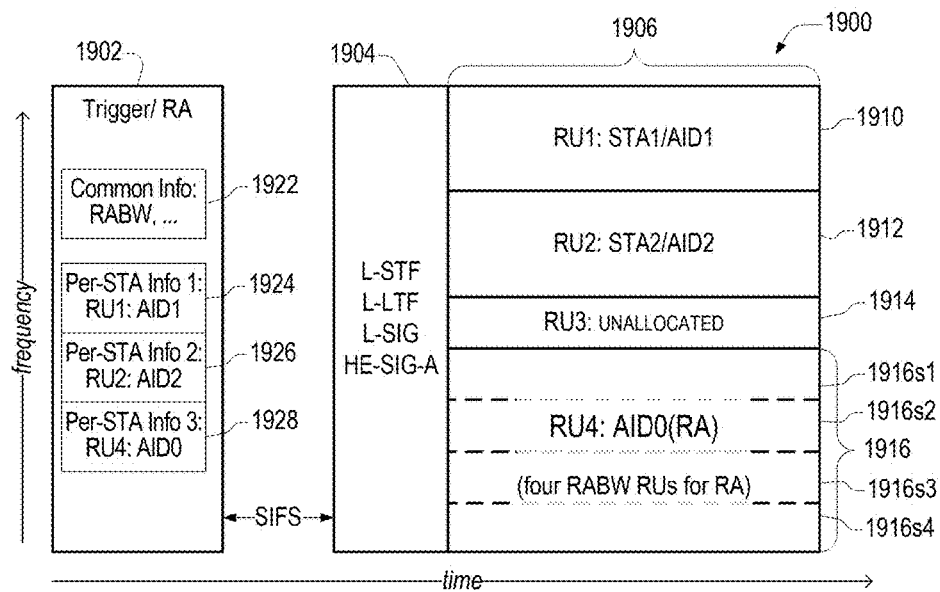
FIG. 19 illustrates allocation of RUs in a UL MU PPDU by an RA Trigger frame, according to an embodiment.

FIG. 19 illustrates allocation of RUs in a subsequent UL MU PPDU 1900 by an RA Trigger frame 1902 according to another embodiment. The UL MU PPDU 1900 includes a first portion 1904 including L-STF, L-LTF, and L-SIG fields based on IEEE Std 802.11n and 802.11ac and an HE-SIG-A field. The UL MU PPDU 1900 also includes an MU payload region 1906. In the embodiment shown in FIG. 19, a per-station info field allocates an RU with a bandwidth greater than a value of an RABW field to RA.

The MU payload region 1906 of the UL MU PPDU 1900 includes first, second, third, and fourth UL RUs 1910, 1912, 1914, and 1916, respectively. In the example illustrated, the first and second UL RUs 1910 and 1912 (herinafter RU1 and RU2), respectively, are 52-tone RUs, the third UL RU 1914 (herinafter RU3) is a 26-tone RU, and the fourth UL RU 1916 (herinafter RU4) is a 106 tone RU.

The RA Trigger frame 1902 includes a common info field 1922. The RA Trigger frame 1902 also includes first, second, and third per-station info fields 1924, 1926, and 1928, respectively. The first per-station info field 1924 allocates the first UL RU RU1 to a first station STA1 having a first AID AID1. The second per-station info field 1926 allocates the second UL RU RU2 to a second station STA2 having a second AID AID2. The third per-station info field 1928 allocates the fourth UL RU RU4 to RA by associating it with a reserved AID AID0. In the example shown, the third UL RU RU3 is not allocated.

In the example shown in FIG. 19, the RABW indicates a bandwidth equal to the bandwidth of a 26 tone RU. The fourth RU RU4 has a bandwidth that is greater than the bandwidth indicated by the RABW. In this example, the bandwidth of the fourth RU RU4 is four times the bandwidth indicated by the RABW.

In another embodiment, the RABW may be included in the per-station info field whose AID is AID0 (e.g. by redefining a subfield that otherwise would be reserved for an RA RU, for instance the "SS Allocation (6 bits)" subfield would naturally be set to a reserved value for RA RUs, however it may be redefined so that a subset of its bits is used to indicate the RA bandwidth).

A station that determines that the 106-tone fourth RU RU4 has been allocated to RA (such as by the fourth RU RU4 being associated with the reserved AID AID0) determines that first, second, third, and fourth included RUs 1916$s1$, 1916$s2$, 1916$s3$, and 1916$s4$ of the fourth RU RU4, each having a bandwidth equal to the bandwidth indicated by the RABW and comprising respective tones that are also comprised within the fourth RU RU4, have each been allocated to RA. The RABW indicates the bandwidth that each station uses when trying to access the UL channel for RA in response to the Trigger or RA Trigger frame 1902.

For example, in an embodiment having an 80 MHz frame having the RUs shown in FIG. 11, when the RABW indicates a bandwidth corresponding to a 26-tone RU and the second 106-tone RU 1164$a$ is indicated as being allocated to RA, the station determines that sixth through ninth 26-tone RUs 1112$a$ through 1118$a$ are each separately available for use for RA. A station may therefore select one of the sixth through ninth 26-tone RUs 1112$a$ through 1118$a$ for use in an UL RA transmission in response to the RA Trigger frame 1902.

In another example for an 80 MHz frame having the RUs shown in FIG. 11, when the RABW indicates a bandwidth corresponding to a 52-tone RU and the second 106-tone RU 1164$a$ is indicated as being allocated to RA, the station determines that third and fourth 52-tone RUs 1146$a$ and 1148$a$ are each separately available for use for RA. A station may therefore select one of the third and fourth 52-tone RUs 1146$a$ and 1148$a$ for use in an UL RA transmission in response to the RA Trigger frame 1902.

In an embodiment, the RABW information is separately signaled or pre-defined by a Beacon frame. Therefore, the indication in the RA Trigger frame 1902 that an RU having a bandwidth larger than the bandwidth indicated in the separately signaled or pre-defined RABW information causes each station receiving the RA Trigger frame 1902 to interpret the bandwidth corresponding to the RU as a set of bandwidths which can be used for random access, and there can be multiple random access channels within the bandwidth corresponding to the RU.

The RABW can be set as the minimum bandwidth, e.g., the bandwidth of a 26-tone RU, and for a given RU layout, any RU can be selected for RA, e.g., RU4 which is 106-tone RU. Compared to the a process wherein each of these four subchannel is separately indicated as being available for use for UL RA, this reduces signaling overhead in the RA Trigger frame 1902. In other words, instead of four indications for allocating the four 26-tone RUs to RA, a single indication allocating a single 106-tone RU to RA can be provided with the same effect.

Figure 20:
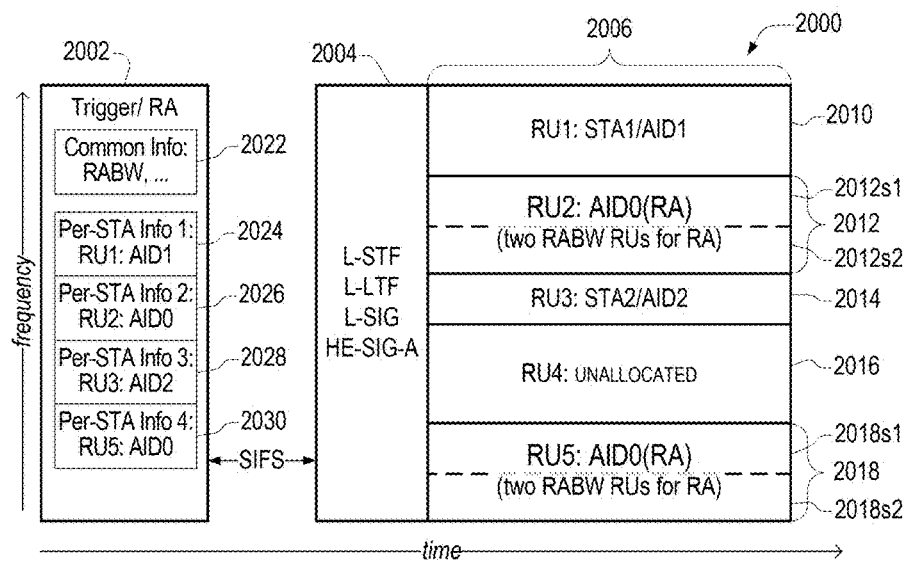
FIG. 20 illustrates allocation of RUs in a UL MU PPDU by an RA Trigger frame, according to an embodiment.

FIG. 20 illustrates another allocation of RUs in a subsequent UL MU PPDU 2000 by an RA Trigger frame 2002 according to the embodiment of FIG. 19. FIG. 20 illustrates the allocation of two non-adjacent portions of the bandwidth of the UL MU PPDU 2000 to RA.

The UL MU PPDU 2000 includes a first portion 2004 including an L-STF, L-LTF, and L-SIG fields based on IEEE Std 802.11n and 802.11ac and an HE-SIG-A field. The UL MU PPDU 2000 also includes an MU payload region 2006.

The MU payload region 2006 of the UL MU PPDU 2000 includes first, second, third, fourth, and fifth UL RUs 2010, 2012, 2014, 2016 and 2018, respectively. In the example illustrated, the first, second, fourth, and fifth UL RUs 2010, 2012, 2016, and 2018 (herinafter RU1, RU2, RU4, and R5), respectively, are each 52-tone RUs, the third UL RU 2014 (herinafter RU3) is a 26-tone RUs.

The RA Trigger frame 2002 includes a common info field 2022. The RA Trigger frame 2002 also includes first, second, third, and fourth per-station info fields 2024, 2026, 2028, and 2030, respectively. The first per-station info field 2024 allocates the first UL RU RU1 to a first station STA1 having a first AID AID1. The second per-station info field 2026 allocates the second UL RU RU2 to RA by associating it with a reserved AID AID0. The third per-station info field 2028 allocates the third UL RU RU3 to a second station STA2 having a second AID AID2. The fourth per-station info field 2030 allocates the fifth UL RU RU5 to RA by associating it with the reserved AID AID0. In the example shown, the fourth UL RU RU4 is not allocated.

In the embodiment shown in FIG. 20, the value of RABW is communicated in the common info of the RA Trigger frame 2002.

In another embodiment, the value of RABW is a priori known by being fixed in an applicable specification.

In another embodiment, the value of RABW is a priori known by being announced in a Beacon frame or in one or more other management frames.

In the example of FIG. 20, the value of RABW indicates a bandwidth corresponding to a 26-tone RU, and the second and fifth RUs RU2 and RU5 each have a bandwidth that is greater than the bandwidth indicated by the RABW. In this example, the second and fifth RUs RU2 and RU5 have respective bandwidths that are twice the bandwidth indicated by the RABW.

A station that determines that the 52-tone second and fifth RUs RU2 and RU5 have been respectively allocated to RA (such as by the second and fifth RUs RU2 and RU5 being respectively associated with the reserved AID AID0) determines thereby that first and second included RUs 2012$s1$ and 2012$s2$ of the second RU RU2 and third and fourth included RUs 2018$s1$ and 2018$s2$ of the fifth RU RU5, each having a bandwidth equal to the bandwidth indicated by the RABW, have each been allocated to RA. In the example of FIG. 20, four RUs are indicated as being available for RA, and the indication is provided using only two per-station info fields.

Figure 21:
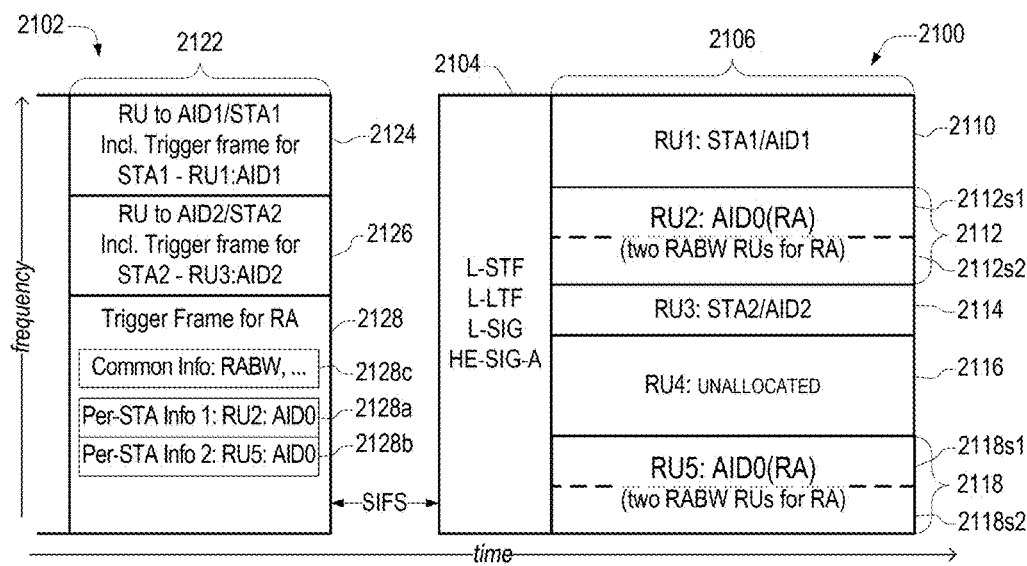
FIG. 21 illustrates allocation of RUs in a UL MU PPDU by Trigger and RA Trigger frames of a DL MU PPDU, according to an embodiment.

FIG. 21 illustrates allocation of RUs in a subsequent UL MU PPDU 2100 by Trigger and RA Trigger frames of a DL MU PPDU 2102 according to another embodiment. The DL MU PPDU 2102, shown in part, includes a payload portion 2122. The UL MU PPDU 2100 includes a first portion 2104 including L-STF, L-LTF, and L-SIG fields based on IEEE Std 802.11n and 802.11ac and an HE-SIG-A field. The UL MU PPDU 2100 also includes an MU payload region 2106.

The payload portion 2122 of the DL MU PPDU 1802 includes first, second, and third DL RUs 2124, 2126, and 2128, respectively. The MU payload region 2106 of the UL MU PPDU 2100 includes first, second, third, fourth, and fifth UL RUs 2110, 2112, 2114, 2116, and 2118, respectively.

The first DL RU 2124 is to be received and decoded by a first station STA1 having a first AID AID1. The second DL RU 2124 is to be received and decoded by a second station STA2 having a second AID AID2. The third DL RU 2128 is a broadcast RU that is to be received and decoded by all the receiving stations, or in some embodiments by all of the receiving stations except STA1 and STA2 due to implementation considerations.

The first DL RU 2124 includes a first trigger frame addressed to the first station STA1 that allocates the first UL RU 2110 (hereinafter RU1) to the first station STA1. The second DL RU 2126 includes a second trigger frame addressed to the second station STA2 that allocates the third UL RU 2114 (hereinafter RU3) to the second station STA2.

The third DL RU 1828 includes an RA Trigger frame addressed to one or more of the stations receiving the DL MU PPDU 1802. The RA Trigger frame includes a common info field 2128c. The RA Trigger frame further includes first and second per-station info 2128a and 2128b allocating second and fifth RUs 2112 and 2116 (hereinafter RU2 and RU5), respectively, to RA by associating them with the reserved AID AID0. In the example shown, the fourth UL RU RU4 is not allocated.

In the example shown in FIG. 21, the value of RABW is either a priori known (the value might be fixed in a specification, or might be announced in a Beacon frame or one or more other management frames) or provided in the common info field 2128c of the RA Trigger frame of the third DL RU 2128.

In the example shown in FIG. 21, the value of RABW is communicated in the common info field 2128c of the RA Trigger frame of the third DL RU 2128. In another embodiment, the value of RABW is a priori known by being fixed in an applicable specification. In another embodiment, the value of RABW is a priori known by being announced in a Beacon frame or in one or more other management frames.

In the example of FIG. 21, the value of RABW indicates a bandwidth corresponding to a 26-tone RU, and the second and fifth RUs RU2 and RU5 each have a bandwidth that is greater than the bandwidth indicated by the RABW; in this example, respective bandwidths that are twice the bandwidth indicated by the RABW.

A station that determines that the 52-tone second and fifth RUs RU2 and RU5 have been respectively allocated to RA (such as by the second and fifth RUs RU2 and RU5 being respectively associated with the reserved AID AID0) determines thereby that first and second included RUs 2112$s$1 and 2112$s$2 of the second RU RU2 and third and fourth included RUs 2118$s$1 and 2118$s$2 of the fifth RU RU5, each having a bandwidth equal to the bandwidth indicated by the RABW, have each been allocated to RA. In the example of FIG. 21, four RUs are indicated as being available for RA, and the indication is provided using only two per-station info fields.

Figure 22:
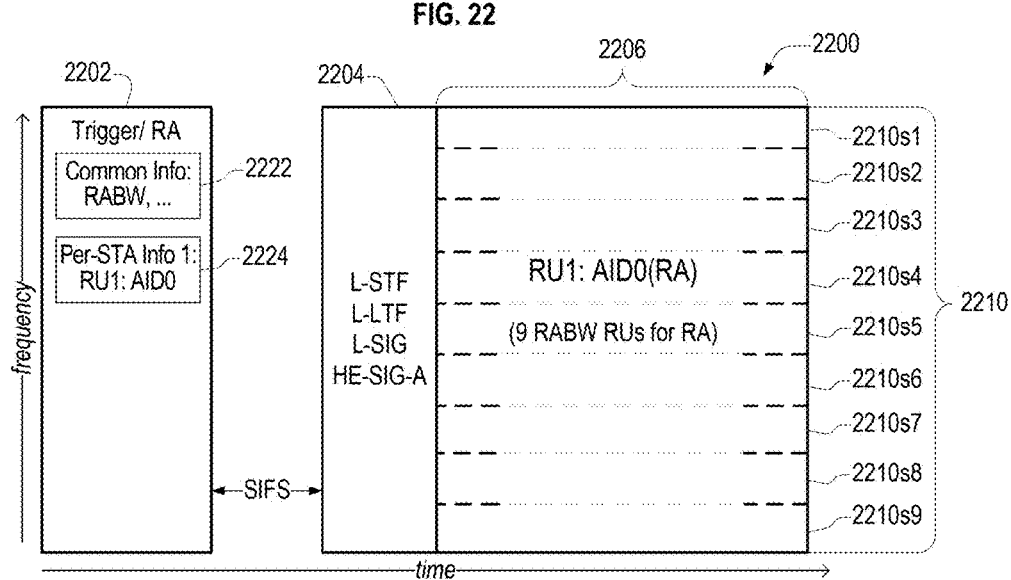
FIG. 22 illustrates allocation of RUs in a UL MU PPDU by an RA Trigger frame, according to an embodiment.

FIG. 22 illustrates another allocation of RUs in a subsequent UL MU PPDU 2200 by an RA Trigger frame 2202 according to an embodiment. FIG. 22 illustrates the allocation of all portions of the bandwidth of the UL MU PPDU 2200 to RA.

The UL MU PPDU 2200 includes a first portion 2204 including an L-STF, L-LTF, and L-SIG fields based on IEEE Std 802.11n and 802.11ac and an HE-SIG-A field, and also includes an MU payload region 2206.

The MU payload region 2206 of the UL MU PPDU 2000 includes a first RU 2210 (hereinafter RU1) having a bandwidth equal to the bandwidth of the UL MU PPDU 2200. In the example illustrated, the first RU RU1 is a 242-tone RU.

The RA Trigger frame 2202 includes a common info field 2222. The RA Trigger frame 2002 also includes a first per-station info field 2224. The first per-station info field 2224, which is the only per-station info field in the Trigger or RA Trigger frame 2202, allocates the first UL RU RU1 to RA by associating it with a reserved AID AID0.

In the example shown in FIG. 22, the value of RABW is communicated in the common info of the RA Trigger frame 2202. In an embodiment, the value of RABW is a priori known by being fixed in an applicable specification. In another embodiment, the value of RABW is a priori known by being announced in a Beacon frame or in one or more other management frames.

In the example of FIG. 22, the value of RABW indicates a bandwidth corresponding to a 26-tone RU, and the first RU RU1 has bandwidth that is greater than the bandwidth indicated by the RABW. In this example, the first RU RU1 has a bandwidth that is nine times the bandwidth indicated by the RABW.

A station that determines that the 242-tone first RU RU1 has been allocated to RA (such as by the first RU RU1 being associated with the reserved AID AID0) determines thereby that first through ninth included RUs 2210$s$1 through 2210$s$9 of the first RU RU1, each having a bandwidth equal to the bandwidth indicated by the RABW, have each been allocated to RA. In the example of FIG. 22, nine RUs are indicated as being available for RA, and the indication is provided using only one per-station info field.

Figure 23:
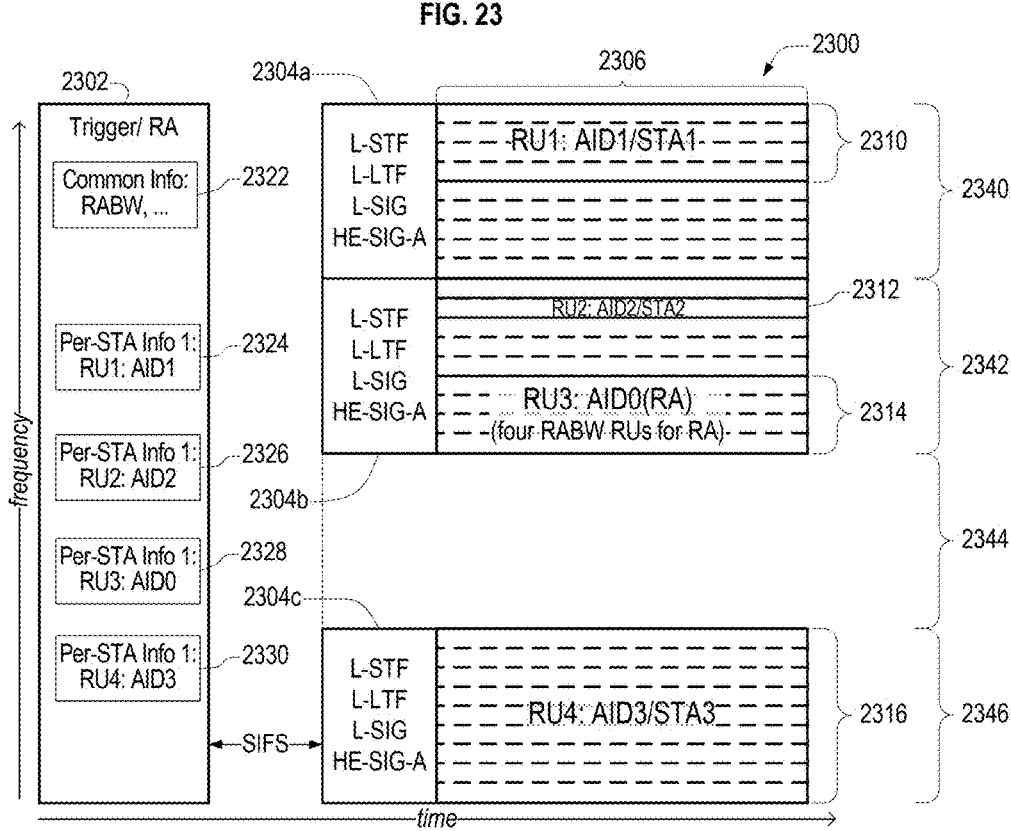
FIG. 23 illustrates allocation of RUs in a preamble-punctured UL MU PPDU by a RA Trigger frame, according to an embodiment.

FIG. 23 illustrates another allocation of RUs in a subsequent UL MU PPDU 2300 by an RA Trigger frame 2302, according to an embodiment. FIG. 23 illustrates allocations of portions of the bandwidth of the UL MU PPDU 2300 to stations and to RA and leaving a subchannel of the UL MU PPDU 2300 unused to cause channel bounding (also called preamble puncturing) of the UL MU PPDU 2300.

In embodiments, a Trigger or RA Trigger frame may not assign all the RUs for UL MU transmission, i.e. some RUs may be left unused. A motivation to do so is operational: for example, if extra-BSS activity is detected in some RUs, then those RUs are better to left unassigned and unused, in order to avoid creating potential interference with or receiving potential interference from the extra-BSS activity. Examples of extra-BSS activity include activity of one or more stations of an overlapping BSS (OBSS) and activity of other technologies that share the bandwidth of the BSS. This technique is called channel bounding or preamble-puncturing.

The RUs that are left unassigned are usually within a bandwidth of 20 MHz; for example, all of the RUs within a 20 MHz sub-channel within an 80 MHz PPDU, an 80+80 MHz PPDU, or a 160 MHz PPDU may left unused. When no RUs are allocated to a 20 MHz subchannel of the UL MU PPDU 2300, no station participating in the UL MU PPDU 2300 will transmit a preamble in that 20 MHz subchannel.

Embodiments allocate UL RUs for RA and to stations while leaving one or more 20 MHz sub-channel within the UL MU PPDU unused to enable preamble puncturing. FIG. 23 illustrates an embodiment of RA signaling being used with preamble puncturing.

The RA Trigger frame 2302 includes a common info field 2322. The RA Trigger frame 2302 also includes first, second, third, and fourth per-station info fields 2324, 2326, 2228, and 2330, respectively. Although FIG. 23 shows the RA Trigger frame 2302 using 80 MHz and having one copy of each of the common info field 2322 and first through fourth per-station info fields 2324 through 2330, embodiments are not limited thereto.

In an embodiment, a Trigger frame consisting of one common info field 2322 and the first through fourth per-station info fields 2324 through 2330 is transmitted over the entire bandwidth, or transmitted over the primary 20 MHz channel and duplicated in all other 20 MHz subchannels used to transmit the RA Trigger frame 2302. In an embodiment, the Trigger frame consisting of one common info field 2322 and the first through fourth per-station info fields 2324 through 2330 is transmitted over the primary 20 MHz channel and duplicated in some of the 20 MHz subchannels excluding the subchannels that are expected to be punctured using the preamble puncturing technique.

In an embodiment, one or more of the first through fourth per-station info fields 2324 through 2330 are duplicated in first and third 20 MHz bandwidths (that is, even-numbered 20 MHz bandwidths) of the Trigger or RA Trigger frame 2302, and the remaining one or more of first through fourth per-station info fields 2324 through 2330 are duplicated in second and third 20 MHz bandwidths (that is, odd-numbered 20 MHz bandwidths) of the Trigger or RA Trigger frame 2302.

The UL MU PPDU 2300 includes a first, second, and third preamble portions 2304a, 2304b, and 2304c, each transmitted on a respective 20 MHz subchannel and each including an L-STF, L-LTF, and L-SIG fields based on IEEE Std 802.11n and 802.11ac and an HE-SIG-A field. The UL MU PPDU 2300 includes an MU payload region 2306.

Each station participating in the UL MU PPDU 2300 transmits a preamble portion in each of the one or more 20 MHz subchannels that the station will use when transmitting in the MU payload region 2306. Accordingly, each station transmitting in a first 20 MHz subchannel 2340 of the MU payload region 2306 transmits the first preamble portion 2304a, each station transmitting in a second 20 MHz subchannel 2342 of the MU payload region 2306 transmits the second preamble portion 2304b, and so on. When a plurality of stations each transmit the same one of the first, second, and third preamble portions 2304a, 2304b, and 2304c, the transmissions of the plurality of stations are air-combined.

The MU payload region 2306 of the UL MU PPDU 2300 includes first, second, third, and fourth UL RUs 2310, 2312, 2314, and 2316, respectively. In the example illustrated, the first UL RU 2310 (RU1) is a 106-tone RU in the first 20 MHz subchannel 2340 of the UL MU PPDU 2300, the second UL RU 2312 (RU2) is a 26-tone RU in the second 20 MHz subchannel 2342 of the UL MU PPDU 2300, the third UL RU 2310 (RU3) is a 106-tone RU in the second 20 MHz subchannel 2342 of the UL MU PPDU 2300, and the fourth UL RU 2316 (RU4) is a 242-tone RU in a fourth 20 MHz subchannel 2346 of the UL MU PPDU 2300.

The first per-station info field 2324 of the Trigger or RA Trigger frame 2302 allocates the first UL RU RU1 to a first station STA1 having a first AID AID1. The second per-station info field 2326 allocates the second UL RU RU2 to a second station STA2 having a second AID AID2. The third per-station info field 2328 allocates the third UL RU RU3 to RA by associating it with a reserved AID AID0. The fourth per-station info field 2330 allocates the fourth UL RU RU4 to a third station STA2 having a third AID AID3.

Because no RU in a third 20 MHz subchannel 2344 of the UL MU PPDU 2300 is allocated to a station or to RA, no stations participating in the UL MU PPDU 2300 will transmit in the third 20 MHz subchannel 2344 during the MU payload region 2306, and as a result no station will transmit a preamble portion in the third 20 MHz subchannel 2344.

An appropriate process is required for performing back off when a UL MU RA transmission is not successfully received. In environments wherein the demand for RA transmission is high, a large number of collisions between RA transmissions may occur, causing many of the RA transmissions to fail. The occurrence of large number of collisions may make it necessary for less than all of the stations that attempted but failed to successfully perform an RA transmission to attempt to transmit when the next random access opportunity occurs. Otherwise the large number of collisions is likely to re-occur.

Embodiments include processes for use in an UL MU RA mechanism, in which a station appropriately increases or decreases its OFDMA Contention Window (CWO) parameter and draws a new OFDMA Back-off timer (OBO) after a successful or unsuccessful UL MU RA transmission transmitted in response to an RA Trigger frame. Embodiments promote fairness among the stations and allow prioritizing of various types of frames, classes of stations, or both.

In an HE WLAN, a Trigger frame is defined that allocates resources for RA. Such a Trigger Frame may be referred to as an RA Trigger frame. An HE AP is allowed to broadcast to one or more stations a parameter in the Trigger frame that permits the one or more stations to initiate a RA process in response to the Trigger frame.

When a station has a frame to send, it initializes its OBO to a random value in the range from 0 to the value of its CWO. A station with a non-zero OBO value decrements its OBO by 1 for every RU allocated to RA within a received RA Trigger frame, down to a minimum value of 0. The OBO for any STA can only be 0 once for each RA Trigger frame.

In an embodiment, when an RU having a bandwidth larger than a value of RABW is allocated to RA to indicate that a plurality of RUs included in the allocated RU are each available for use for RA, the OBO is decremented by the number of available RUs for RA (and those STAs with OBO less than the number of RA RUs are set to zero).

A station having an OBO equal to 0 or decremented to 0 randomly selects any one of the RUs allocated for RA and transmits a frame using the selected RU.

In the HE WLAN, a cascaded sequence of Trigger frames may be indicated using a bit in the Trigger frame. In an HE WLAN, a mechanism may be supported that allows the Beacon frame to indicate the target transmission time(s) of one or more Trigger frame(s) that allocate resources for random access.

In an embodiment, an AP assigns and announces a set of CWO parameters for a set of types of frames, a set of stations, or a combination of a set of stations and a set of frames. A first set of stations may include only stations associated with the BSS. A second set of stations may include only stations not associated with the BSS.

A CWO parameter may comprise two or more parameters such as two or more of an OFDMA Contention Window minimum (CWOmin), an OFDMA Contention Window maximum (CWOmax), and an OFDMA Contention Window delta (CWOdelta). The CWOmin identifies a minimum value of the CWO. The CWOmax identifies a maximum of the CWO. The CWOdelta identifies an amount to increase or decrease the CWO in case of successful or unsuccessful RA transmission, respectively.

In an embodiment, an AP assigns and announces four CWO parameters for the access categories Voice (VO), Video (VI), Background (BK), and Best Effort (BE), respectively.

In an embodiment, an AP assigns at least CWO parameters as follows:
(a) a first CWO parameter assigned to associated stations for the frames that report buffer status (BS) where the frame that carries the BS has a length less than predetermined value.
(b) a second CWO parameter assigned to unassociated stations and used to send pre-association frames such as Probe Request, Association Request or other pre-association discovery (PAD) frames.
(c) a third CWO parameter assigned to associated stations for control frames and management frames. In some embodiments, the third CWO parameter is assigned only for control frames and management frames having a length less than a predetermined value of the associated stations.
(d) a fourth CWO parameter assigned to associated stations for data frames. In some embodiments, the fourth CWO parameter is assigned only for data frames having a length less than a predetermined value of the associated stations.
(e) a fifth CWO parameter assigned to associated stations for other frames that do not satisfy the length restriction of the third CWO parameters, fourth CWO parameters, or both.

In an embodiment, a cascaded sequence of RA Trigger (also known as RAT) frames is allowed and the station that sends a RAT frame indicates an approximate time that the next one or more RAT frames are expected to appear. The indication appears in a subfield in the Common Info field of a RAT frame, denoted as Next RAT frame (NRAT) subfield. The time that is indicated in the NRAT subfields is in units of 1, 9, 16, or 32 microseconds or another predetermined unit.

In an embodiment, the indication of the one or more expected future RAT frames includes:
(a) one or more NRTA parameters indicate the approximate time of the subsequent one or more RAT frames that have all the RUs within a UL MU transmission assigned for random access, or
(b) one or more NRTA parameters indicate the approximate time of the subsequent one or more RAT frames that have a subset of the RUs within a UL MU transmission assigned for random access, or
(c) both (a) and (b).

In an embodiment, an HE AP sets a Trigger Type subfield in the Common Info of a Trigger frame to a value associated with RA to indicate that the Trigger frame is a RAT frame. The RAT frame includes parameters for an RA operation. An AP may have different RA regimes, using different respective parameters, depending on, for example, how many stations are contending for RA.

The Common Info field in the RAT frame includes the parameters for random back off operation (for example, a CWO parameter), an indication for RA retransmission (RAR) rules in an RAR parameter, and the like.

In an embodiment, the RAR parameter having a first value indicates that a station shall increase its CWO parameter and draw a new OBO value when an earlier attempt by the station to send a frame in response to an earlier RAT frame was unsuccessful, and the RAR parameter having a second value indicates that the station is to maintain the same value for the CWO parameter when the station's earlier attempt was unsuccessful.

In an embodiment, the Common Info field includes a parameter named Next Random Access Trigger, described below.

In an embodiment, a Per-User Info field of RAT frame includes a reserved AID that indicates that a group of stations may access the medium in response to the RAT frame, and MCS, NSS, and other PHY parameters that the responding stations shall adhere to when transmitting frames in response to the RAT frame.

When a station transmits a frame in response to a RAT frame, the transmitted frame may not be received successfully by the sender of the RAT frame (for example, the AP that the station is associated with). The transmitted frame may not be received successfully because the frame collided with other frames that were sent in the same RU of the UL MU frame, or because the decoding of the frame was unsuccessful due to Additive White Gaussian Noise (AWGN), fading, or some other reason. When the frame was not successfully received, the station will resend the frame either as an attempt in the next RA opportunity, or in a non UL MU opportunity.

In an embodiment, a station determines that a transmitted frame has collided with another transmission when the station transmitted the frame in an RA opportunity in response to a RAT frame and the station does not receive a timely ACK or Block ACK (BA) frame in response to the transmission of the frame. In an embodiment, the station determines that the transmitted frame collided with another transmission via one or more other methods.

In an embodiment, when the station determines that a transmitted frame has collided with another transmission, the station resends (that is, re-transmit) the frame.

FIG. 24 illustrates a process 2400 for re-transmitting a frame, according to an embodiment. In an embodiment, a station resends a frame that had previously experienced a collision during an RA opportunity. The station resends the frame in a Single User (SU) frame (and not as a response to a subsequent RAT frame). When a collision or an unsuccessful decoding of a frame transmitted in response to a RAT frame occurs, the station 1) does not increase its CW backoff timers, 2) transmits the frame according to the rules for a relevant non-RA medium access procedure (such as EDCA or DCF), and 3) resets the OBO timer it had used for the previous RA transmission of the frame. The process 2400 may be performed by a station.

At S2402, the process 2400 transmits a frame during an RA opportunity. The RA opportunity can be, for example, an RU in an UL MU OFDMA frame that was allocated to RA by an RA Trigger frame that preceded the UL MU OFDMA frame.

At S2404, the process 2400 determines whether the frame transmitted at S2402 was successfully received. In an embodiment, the process 2400 determines that the frame was successfully received when an ACK or BA frame corresponding to the transmitted frame is timely received, and determines that the frame was not successfully received when the ACK or BA frame is not timely received (e.g. within an ACKtimeout duration), but embodiments are not limited thereto. The process 2400 proceeds to S2406 when the frame was not successfully received. Otherwise, at S2404 the process 2400 ends.

At S2406, the process 2400 transmits the frame as a single-user frame. For example, the process 2400 may transmit the frame after using an EDCA or DCF process to obtain ownership of the channel.

At S2408, the process resets the OBO timer used for the transmission performed at S2402. The process 2400 then ends.

FIG. 25 illustrates a process 2500 in which a station resend a frame that was unsuccessfully transmitted during an RA opportunity. The station resend the frame in a subsequent RA opportunity as a response to an upcoming RAT frame, according to an embodiment. The process 2500 may be performed by a station.

At S2502, the process 2500 transmits a frame during a first RA opportunity. The RA opportunity can be, for example, an RU in a first UL MU OFDMA frame that was allocated to RA by a first RA Trigger frame that preceded the UL MU OFDMA frame.

At S2504, the process 2500 determines whether the frame transmitted at S2502 was successfully received. In an embodiment, the process 2500 determines that the frame was successfully received when an ACK or BA frame corresponding to the transmitted frame is timely received, and determines that the frame was not successfully received when the ACK or BA frame is not timely received (e.g. within an ACKtimeout duration), but embodiments are not limited thereto. The process 2500 proceeds to S2506 when the frame was not successfully received. Otherwise, at S2504 the process 2500 ends.

At S2506, the process 2500 increases the CWO of the station. The resulting behavior is appropriate for situations where an AP keeps the same CWO value for a long time interval (such as one or more Beacon intervals).

In an embodiment, at S2506 the process 2500 increases the CWO linearly by adding a predetermined increment to the CWO. In an embodiment, the predetermined increment is the value of CWOdelta.

In another embodiment, at S2506 the process 2500 increases the CWO exponentially by multiplying the CWO by a predetermined value (for example, 2).

In another embodiment, at S2506 the process 2500 increases the CWO by setting the CWO to a smallest value greater than the current value of the CWO out of a set of CWO values {CWO1, CWO2, CWO3, . . . , CWOK}.

In an embodiment, at S2506, when increasing the CWO would result in a CWO value greater than a maximum value (such as CWOmax), the CWO is instead set to the maximum value.

At S2508, the process 2500 draws a new ODO according to the updated CWO value produced at S2506. That is, the process 2500 initializes the ODO to a randomly generated value according to the updated CWO value.

At S2510, the process 2500 transmits the frame during a subsequent RA opportunity subsequent to the first RA opportunity. The subsequent RA opportunity can be, for example, an RU in a UL MU OFDMA frame that was allocated to RA by an RA Trigger frame that preceded the UL MU OFDMA frame.

At S2512, the process 2500 determines whether the frame re-transmitted at S2510 was successfully received. In an embodiment, the process 2500 determines that the re-transmitted frame was successfully received when an ACK or BA frame corresponding to the re-transmitted frame is timely received, and determines that the re-transmitted frame was not successfully received when the ACK or BA frame is not timely received (e.g. within an ACKtimeout duration), but embodiments are not limited thereto. The process 2500 proceeds to S2506 when the frame was not successfully received. Otherwise, at S2512 the process 2500 proceeds to S2514.

At S2514, the process 2500 decreases the CWO of the station.

In an embodiment, at S2514 the process 2500 decreases the CWO linearly by subtracting a predetermined increment from the CWO. In an embodiment, the predetermined increment is the value of CWOdelta.

In another embodiment, at S2514 the process 2500 decreases the CWO exponentially by dividing the CWO by a predetermined value (for example, 2).

In another embodiment, at S2514 the process 2500 decreases the CWO by setting the CWO to a largest value less than the current value of the CWO out of a set of CWO values $\{CWO_1, CWO_2, CWO_3, \ldots, CWO_K\}$.

In another embodiment, at S2514 the process 2500 decreases the CWO by setting the CWO to a starting value provided by the AP. In an embodiment, the starting value is CWOmin.

In an embodiment, at S2514, when decreasing the CWO would result in a CWO value less than a minimum value (such as CWOmin), the CWO is instead set to the minimum value.

Figure 26:
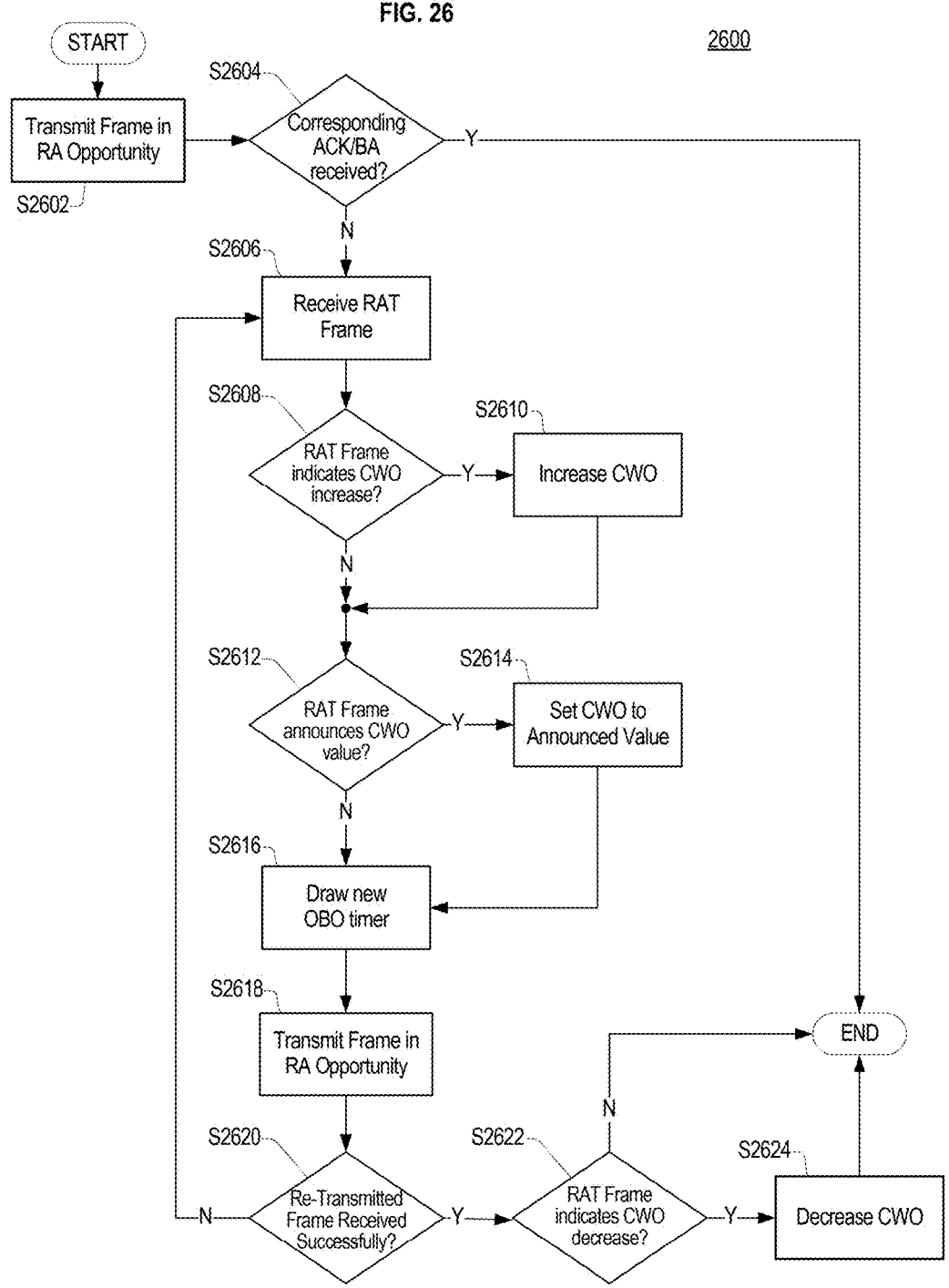
FIG. 26 illustrates a process for re-transmitting a frame, according to another embodiment.

FIG. 26 illustrates a process 2600 in which a station resend a frame that was unsuccessfully transmitted during an RA opportunity in a subsequent RA opportunity as a response to an upcoming RAT frame, according to an embodiment. The process 2600 may be performed by a station. In the process 2600, CWO update behavior of the station may be altered by information in the upcoming RAT frame.

In the process 2600, a station does not increase its CWO timer when the AP announces a new CWO value in a next RAT frame. Furthermore, in the process 2600, the AP may indicate in the RAT frame whether the CWO is to be incremented after an unsuccessful RA transmission and whether the CWO is to be decremented after a successful RA transmission.

At S2602, the process 2600 transmits a frame during a first RA opportunity. The RA opportunity can be, for example, an RU in a first UL MU OFDMA frame that was allocated to RA by a first RA Trigger frame that preceded the UL MU OFDMA frame.

At S2604, the process 2600 determines whether the frame transmitted at S2602 was successfully received. In an embodiment, the process 2600 determines that the frame was successfully received when an ACK or BA frame corresponding to the transmitted frame is timely received, and determines that the frame was not successfully received when the ACK or BA frame is not timely received (e.g. within an ACKtimeout duration), but embodiments are not limited thereto. The process 2600 proceeds to S2606 when the frame was not successfully received. Otherwise, at S2604 the process 2600 ends.

At S2606, the process 2600 receives a Random Access Trigger (RAT) frame.

At S2608, the process 2600 determines whether the RAT frame includes an increase indication indicating whether the CWO is or is not be increased when a RA transmission is not successfully received. In an embodiment, an RA Retransmission (RAR) field of the RAT frame includes the increase indication. When the increase indication indicates that the CWO is to be increased when an RA transmission is not successfully received, the process 2600 proceeds to S2610. Otherwise, at S2608 the process 2600 proceeds to S2612.

At S2610, the process 2600 increases the CWO of the station. The increase in the CWO may be performed according to any of the embodiments disclosed for the process 2500 of FIG. 25 in relation to S2506 of that figure.

At S2612, the process 2600 determines whether the RAT frame received in S2606 announces a new CWO value. When the RAT frame announces a new CWO value, the process 2600 proceeds to S2614. Otherwise, at S2612 the process 2600 proceeds to S2616.

At S2614, the process 2600 sets the CWO to the value announced in the RAT frame received in S2606. The process 2600 then proceeds to S2616.

At S2616, the process 2600 draws a new ODO according to the CWO value. That is, the process 2600 initializes an ODO timer to a randomly generated value according to the updated CWO value.

At S2618, the process 2600 re-transmits the frame during an RA opportunity according to the RAT frame received during S2606. The RA opportunity can be, for example, an RU in an UL MU OFDMA frame that was allocated to RA by the RAT frame received during S2606.

At S2620, the process 2600 determines whether the frame re-transmitted at S2618 was successfully received. In an embodiment, the process 2600 determines that the frame was successfully received when an ACK or BA frame corresponding to the re-transmitted frame is timely received, and determines that the frame was not successfully received when the ACK or BA frame is not timely received (e.g. within an ACKtimeout duration), but embodiments are not limited thereto. The process 2600 proceeds to S2606 when the frame was not successfully received. Otherwise, at S2620 the process 2600 proceeds to S2622.

At S2622, the process 2600 determines whether the RAT frame includes a decrease indication indicating that the CWO is or is not be decreased when a RA transmission is successfully received. In an embodiment, an RA Retransmission (RAR) field of the RAT frame includes the decrease indication.

In an embodiment, the decrease indication is the same as the increase indication discussed with respect to S2608, and indicates both whether the CWO is increased when a transmission is unsuccessful and whether the CWO is decreased when a transmission is successful.

When the decrease indication indicates that the CWO is to be decreased when an RA transmission is successfully received, the process 2600 proceeds to S2624. Otherwise, at S2622 the process 2600 ends.

At S2624, the process 2600 decreases the CWO of the station. The increase in the CWO may be performed according to any of the embodiments disclosed for the process 2500 of FIG. 25 in relation to S2514 of that figure. The process 2600 then ends.

In an embodiment, after a station sends a frame successfully in response to a RAT frame, when the station determines to send another frame in response to a subsequent RAT frame, the station shall initiate the OBO timer according to the CWO parameter.

Embodiments include rules for random access mechanisms. Embodiments promote fairness among stations and allow prioritizing various types of frames, classes of station, or both.

The solutions provided herein have been described with reference to a wireless LAN system; however, it should be understood that these solutions are also applicable to other network environments, such as cellular telecommunication networks, wired networks, etc.

The above explanation and figures are applied to an HE station, an HE frame, an HE PPDU, an HE-SIG field and the like of the IEEE 802.11ax amendment, but they can also applied to a receiver, a frame, PPDU, a SIG field, and the like of another future amendment of IEEE 802.11.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

In some cases, an embodiment of the invention may be an apparatus (e.g., an AP station, a non-AP station, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method implemented by a station of performing a random access (RA) communication, the method comprising:

receiving, by the station, a first trigger frame;

determining, by the station using information in one or more per-station information parts of the first trigger frame, that one or more resource units (RUs) of a response transmission are allocated to RA;

selecting, by the station, a selected RU from the one or more RUs allocated to RA; and in response to receiving the first trigger frame, performing, by the station, the RA communication using the selected RU of the response transmission, wherein determining that the one or more RUs of the response transmission are allocated to RA comprises:

determining that a first per-station information part associates an identifier of a first RU of the response transmission with a predetermined reserved Association Identifier (AID);
   determining that the first RU is allocated to RA in response to a bandwidth of the first RU being equal to a bandwidth indicated by an RA Bandwidth (RABW) value; and
   determining that a second RU of the response transmission is allocated to RA in response to the bandwidth of the first RU being greater than the bandwidth indicated by the RABW value, a bandwidth of the second RU being equal to the bandwidth indicated by the RABW value, and the second RU being comprised of tones that are within the first RU.

2. The method of claim 1, wherein the one or more per-station information parts are one or more per-station info subfields of a High Efficiency Signal B (HE-SIG-B) field.

3. The method of claim 1, wherein determining that the one or more RUs of the response transmission are allocated to RA comprises:
   determining that an RU of the response transmission is allocated to RA when none of the one or more per-station information parts include allocation information for the RU.

4. The method of claim 1, further comprising:
   determining the RABW value from an indication in a common information part of the first trigger frame.

5. The method of claim 4, wherein the common information part is a common information subfield of a High Efficiency Signal B (HE-SIG-B) field of the first trigger frame.

6. The method of claim 1, further comprising:
   receiving a Beacon frame; and
   determining the RABW value from an indication in the beacon frame.

7. The method of claim 1, wherein the RABW value is a predetermined value.

8. The method of claim 1, wherein determining that the one or more RUs of the response transmission are allocated to RA comprises:
   determining that a second per-station information part associates an identifier of a third RU of the response transmission with a predetermined AID;
   determining that the third RU is allocated to RA when a bandwidth of the third RU is equal to the bandwidth indicated by the RABW value; and
   determining that a fourth RU of the response transmission is allocated to RA when the bandwidth of the third RU is greater than the bandwidth indicated by the RABW value, a bandwidth of the fourth RU is equal to the bandwidth indicated by the RABW value, and the fourth RU is comprised of tones that are comprised within the third RU.

9. The method of claim 8, wherein determining that the one or more RUs of the response transmission are allocated to RA comprises:
   determining that a fifth RU of the response transmission is allocated to RA when the bandwidth of the third RU is greater than the bandwidth indicated by the RABW value, a bandwidth of the fifth RU is equal to the bandwidth indicated by the RABW value, and the fifth RU is comprised of tones that are comprised within the third RU and are different than the tones comprising the fourth RU.

10. The method of claim 1, wherein determining that the first per-station information part associates the identifier of the first RU of the response transmission with the predetermined reserved AID comprises:
   determining that the predetermined reserved AID indicates that the first RU is allocated to RA for a predetermined set of stations;
   determining that the station is a member of the predetermined set of stations corresponding to the first reserved AID.

11. The method of claim 10, wherein determining whether the station is a member of the set of station corresponding to the predetermined reserved AID comprises performing a masked comparison of the AID of the station to the predetermined reserved AID.

12. A method implemented by a station of performing a random access (RA) communication, the method comprising:
   receiving, by the station, a first trigger frame;
   determining, by the station using information in one or more per-station information parts of the first trigger frame, that one or more resource units (RUs) of a response transmission are allocated to RA;
   selecting, by the station, a selected RU from the one or more RUs allocated to RA; and
   in response to receiving the first trigger frame, performing, by the station, the RA communication using the selected RU of the response transmission,
   wherein determining that the one or more RUs of the response transmission are allocated to RA comprises:
      determining that a per-station information part associates an identifier of a first RU of the response transmission with a first reserved Association Identifier (AID), the first reserved AID being one of a plurality of reserved AIDs, the plurality of reserved AIDs respectively corresponding to sets of stations;
      determining whether the station is a member of the set of stations corresponding to the first reserved AID;
      determining that the first RU is allocated to RA when the station is determined to be a member of the set of stations corresponding to the first reserved AID; and
      determining that the first RU is not allocated to RA when the station is determined to not be a member of the set of stations corresponding to the first reserved AID, and
   wherein the set of stations corresponding to the first reserved AID includes stations not associated with a Basic Service Set (BSS) of the transmitter of the first trigger frame.

13. The method of claim 1, wherein the first trigger frame is received in a received multi-user transmission.

14. The method of claim 13, wherein the received multi-user transmission includes a second trigger frame that allocates one or more RUs of the response transmission to another station.

15. A method implemented by a station of performing a random access (RA) communication, the method comprising:
   receiving, by the station, a first trigger frame;
   determining, by the station using information in one or more per-station information parts of the first trigger frame, that one or more resource units (RUs) of a response transmission are allocated to RA;
   selecting, by the station, a selected RU from the one or more RUs allocated to RA;
   in response to receiving the first trigger frame, performing, by the station, the RA communication using the selected RU of the response transmission;

performing the RA communication by transmitting a data unit associated with a first Access Category (AC);

receiving, by the station, an acknowledgement frame corresponding to the transmitted data unit;

in response to receiving the acknowledgement frame corresponding to the transmitted data unit, resuming a backoff counter countdown associated with the first AC; and decrementing a backoff counter associated with a second AC in response to transmitting the data unit associated with the first AC.

16. The method of claim 15, further comprising:

holding the backoff counter countdown associated with the first AC in response to receiving the first trigger frame.

* * * * *